US010162853B2

(12) United States Patent
Venkataraman et al.

(10) Patent No.: US 10,162,853 B2
(45) Date of Patent: Dec. 25, 2018

(54) SYSTEMS AND METHODS FOR GENERATING SMART RESPONSES FOR NATURAL LANGUAGE QUERIES

(71) Applicant: Rovi Guides, Inc., Santa Clara, CA (US)

(72) Inventors: Sashikumar Venkataraman, Andover, MA (US); Abubakkar Siddiq, Methuen, MA (US); Ahmed Nizam Mohaideen P, Kovilpatti (IN); Sankar Ardhanari, Windham, NH (US)

(73) Assignee: Rovi Guides, Inc., San Jose, CA (US)

( * ) Notice: Subject to any disclaimer, the term of this patent is extended or adjusted under 35 U.S.C. 154(b) by 277 days.

(21) Appl. No.: 15/056,828

(22) Filed: Feb. 29, 2016

(65) Prior Publication Data
US 2017/0161320 A1 Jun. 8, 2017

Related U.S. Application Data

(60) Provisional application No. 62/264,793, filed on Dec. 8, 2015.

(51) Int. Cl.
G06F 17/30 (2006.01)
G10L 15/18 (2013.01)
(Continued)

(52) U.S. Cl.
CPC .... *G06F 17/30401* (2013.01); *G06F 17/3053* (2013.01); *G06F 17/30528* (2013.01);
(Continued)

(58) Field of Classification Search
CPC ......... G06F 17/30401; G06F 17/30528; G06F 17/3053; G06F 17/30867;
(Continued)

(56) References Cited

U.S. PATENT DOCUMENTS 5,600,303 A * 2/1997 Husseiny ............... F41H 11/12
340/568.1
6,075,843 A * 6/2000 Cave .................... H04M 1/247
379/88.13

(Continued)

OTHER PUBLICATIONS

U.S. Appl. No. 15/056,771, filed Feb. 29, 2016, Sashikumar Venkataraman.

*Primary Examiner* — Phuong Thao Cao
(74) *Attorney, Agent, or Firm* — Haley Guiliano LLP

(57) ABSTRACT

Methods and systems are described for responding to natural language queries. Specifically a natural language query is received and a query template that corresponds to the natural language query is determined. One or more search results corresponding to the natural language query are retrieved. One or more attributes associated with the user equipment device are identified and based on those attributes a first response template associated with an audio-only response to the natural language query, a second response template associated with a visual-only response to the natural language query, or a third response template associated with an audio-visual response to the natural language query is selected. A response to the natural language query is generated based on the selected response template and the retrieved one or more search results.

14 Claims, 12 Drawing Sheets

(51) Int. Cl.
*G10L 15/22* (2006.01)
*G10L 13/04* (2013.01)
*G10L 13/033* (2013.01)
*H04N 21/482* (2011.01)
*H04N 21/258* (2011.01)

(52) U.S. Cl.
CPC ...... *G06F 17/30867* (2013.01); *G10L 13/033* (2013.01); *G10L 13/043* (2013.01); *G10L 15/18* (2013.01); *G10L 15/22* (2013.01); *H04N 21/25833* (2013.01); *H04N 21/25841* (2013.01); *H04N 21/4828* (2013.01)

(58) Field of Classification Search
CPC ....... H04N 21/25841; H04N 21/25833; H04N 21/4848; G10L 13/043; G10L 15/22; G10L 13/033; G10L 15/18
USPC .......................................................... 707/722
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |
| 6,721,706 B1* | 4/2004 | Strubbe | G10L 15/18 704/257 |
| 6,769,606 B1* | 8/2004 | Blosser | G06Q 20/209 235/379 |
| 7,165,098 B1 | 1/2007 | Boyer | |
| 7,559,001 B2* | 7/2009 | Betawar | G06F 11/263 375/224 |
| 7,580,892 B1* | 8/2009 | Blosser | G07F 19/20 235/375 |
| 7,761,892 B2 | 7/2010 | Ellis | |
| 7,917,497 B2* | 3/2011 | Harrison | G06F 17/30663 707/713 |
| 8,046,801 B2 | 10/2011 | Ellis | |
| 8,626,681 B1* | 1/2014 | Jurca | G06F 15/18 706/12 |
| 8,996,538 B1* | 3/2015 | Cremer | G06F 17/30864 707/749 |
| 9,626,966 B2* | 4/2017 | Berndt | G10L 15/22 |
| 2002/0173960 A1* | 11/2002 | Ross | G10L 15/1822 704/257 |
| 2002/0174430 A1 | 11/2002 | Ellis | |
| 2004/0193420 A1* | 9/2004 | Kennewick | G06F 17/30654 704/257 |
| 2004/0234938 A1* | 11/2004 | Woolf | G09B 7/02 434/353 |
| 2005/0251827 A1 | 11/2005 | Ellis | |
| 2006/0069546 A1* | 3/2006 | Rosser | G10L 15/22 704/9 |
| 2006/0136375 A1* | 6/2006 | Cox | G06F 17/30657 |
| 2007/0208732 A1* | 9/2007 | Flowers | G06F 17/30867 |
| 2008/0243744 A1* | 10/2008 | Isaacs | G06F 17/30401 706/46 |
| 2009/0019020 A1* | 1/2009 | Dhillon | G06F 17/30398 |
| 2009/0303205 A1* | 12/2009 | Seibert | G06F 1/1616 345/204 |
| 2010/0114927 A1* | 5/2010 | Becker | G06F 17/30401 707/759 |
| 2010/0114944 A1* | 5/2010 | Adler | G10L 13/027 707/770 |
| 2010/0153885 A1 | 6/2010 | Yates | |
| 2010/0293236 A1* | 11/2010 | Wisner | G06Q 10/107 709/206 |
| 2011/0193806 A1* | 8/2011 | Kim | G06F 1/1615 345/173 |
| 2012/0036121 A1* | 2/2012 | Jitkoff | G06F 17/30867 707/722 |
| 2012/0290509 A1* | 11/2012 | Heck | G10L 15/06 706/11 |
| 2013/0226846 A1 | 8/2013 | Li | |
| 2013/0232006 A1* | 9/2013 | Holcomb | G06F 17/30864 705/14.54 |
| 2013/0325839 A1* | 12/2013 | Goddard | G06F 17/30867 707/708 |
| 2014/0007210 A1 | 1/2014 | Murakami | |
| 2014/0019435 A1 | 1/2014 | Ceri | |
| 2014/0052445 A1* | 2/2014 | Beckford | G10L 15/00 704/251 |
| 2014/0171133 A1 | 6/2014 | Stuttle | |
| 2014/0289226 A1* | 9/2014 | English | G06F 17/30746 707/722 |
| 2014/0344261 A1* | 11/2014 | Navta | G06F 17/30864 707/723 |
| 2014/0351287 A1* | 11/2014 | Wolf | G06F 17/30424 707/779 |
| 2014/0358890 A1* | 12/2014 | Chen | G06F 17/30867 707/710 |
| 2015/0026212 A1* | 1/2015 | Fink | G06F 17/30483 707/774 |
| 2015/0066479 A1* | 3/2015 | Pasupalak | G06F 17/27 704/9 |
| 2015/0169744 A1* | 6/2015 | Walkingshaw | G06Q 30/0251 707/738 |
| 2015/0170653 A1* | 6/2015 | Berndt | G10L 15/22 704/275 |
| 2015/0205858 A1* | 7/2015 | Xie | G06O 50/01 707/755 |
| 2015/0234833 A1* | 8/2015 | Cremer | G06F 17/3053 707/626 |
| 2015/0363407 A1* | 12/2015 | Huynh | H04W 4/21 707/738 |
| 2016/0029368 A1 | 1/2016 | Borenstein | |
| 2016/0063595 A1 | 3/2016 | Oral | |
| 2016/0140439 A1* | 5/2016 | Adderly | G06N 5/02 706/46 |
| 2016/0162066 A1* | 6/2016 | Shimotono | G06F 3/1423 345/175 |
| 2016/0179922 A1* | 6/2016 | Crupi | G06F 17/30401 707/737 |
| 2016/0232298 A1* | 8/2016 | Campbell | G06F 19/322 |
| 2016/0232303 A1* | 8/2016 | Amit | G06F 17/30401 |
| 2017/0026705 A1* | 1/2017 | Yeh | G06F 17/278 |
| 2017/0060287 A1* | 3/2017 | Gasselin de Richebourg | G06F 3/0416 |
| 2017/0069043 A1* | 3/2017 | Doyle | G06Q 10/10 |
| 2017/0140057 A1* | 5/2017 | Castelli | G06F 17/30867 |
| 2017/0161319 A1 | 6/2017 | Venkataraman | |
| 2017/0188185 A1* | 6/2017 | Hogg | H04W 4/02 |
| 2017/0199928 A1* | 7/2017 | Zhao | G06F 17/11 |
| 2017/0262472 A1 | 9/2017 | Goldenberg | |
| 2017/0270912 A1* | 9/2017 | Levit | G10L 15/063 |
| 2018/0032930 A1* | 2/2018 | Kolb | G06F 17/30401 |

* cited by examiner

SYSTEMS AND METHODS FOR GENERATING SMART RESPONSES FOR NATURAL LANGUAGE QUERIES

CROSS REFERENCE TO RELATED APPLICATIONS

This application claims the benefit of U.S. provisional patent application No. 62/264,793, filed Dec. 8, 2015, which is hereby incorporated by reference in its entirety.

BACKGROUND

A number of systems are in existence today that provide responses to natural language queries. These systems provide the same responses to the same queries making the responses monotonous and machine-like. For example, if the user asks "What is the weather like," current systems will always respond the same way, for example, with the number of degrees and whether it may rain. These systems will not take into account information such as time of day or desired output format (e.g., audio, visual, or another suitable format).

SUMMARY

Therefore, it is desirable to provide, based on different circumstances and different user equipment devices, different smart responses and/or different types of smart responses to natural language queries. Specifically, providing different smart responses and/or different types of smart responses under different circumstances may create a more human-like and less monotonic system.

In some aspects, systems and methods are described to provide for a natural language processing system that automatically generates an intelligent response to a natural language query based on one or more attributes associated with a user. Specifically, the system may be, at least partly implemented on a user equipment device that includes a user input interface. The user input interface may be configured to receive the natural language query. For example, the user input interface may receive the natural language query through a microphone or a keyboard associated with the user equipment device. It should be noted that the user input interface may be configured to receive the natural language query from any type of input device, including, but not limited to, mechanical motion devices, audio input devices, visual input devices, touch input devices, or other suitable input devices.

The user equipment device may also include control circuitry that may be configured to process the received natural language query in order to generate a smart response. Specifically, the control circuitry may be configured to receive, from the user input interface the natural language query. For example, the user input interface may receive the natural language query in one of a number of formats (e.g., visual, audio, textual, or another suitable format). The user input interface may, upon receipt of the natural language query, process the query and convert the query into a format that can be further processed by the control circuitry (e.g., textual format).

In order to respond to the natural language query, the control circuitry may need to match the received query to a query template that enables the control circuitry to determine which portions of the query are terms for searching and which terms are part of a question/inquiry phrase (e.g., what, why, where, or another suitable term). The control circuitry may be configured to determine which query template of a plurality of query templates corresponds to the natural language query. For example, the received natural language query may be "Who is the director of 'Titanic?'" The control circuitry may determine that a matching template is "Who is" followed by variable data to be used in generating a response. Therefore, the control circuitry may search for "director of Titanic" with "Who is" being the question/inquiry phrase.

At this point, the control circuitry may execute a search to find an answer or answers to the natural language query. Specifically, the control circuitry may be configured to retrieve one or more search results corresponding to the natural language query. For example, as described above, if the natural query template is "Who is" followed by variable data, the control circuitry may perform a search based on the variable data. Specifically, the control circuitry may execute a search for "director of Titanic." The search may be a database search and/or an Internet search. It should be noted that any type of search engine either a commercial search engine and/or a specialized search engine may be used.

Additionally or optionally, the control circuitry may begin to determine how to tailor the response to the user to make the system sound more human-like. Thus, the control circuitry may be configured to select, based on a selection criteria, one or more attributes of a plurality of attributes associated with the user. For example, at different times of the day the user may prefer different lengths of response or different type of information. During the morning hours, the user may be in a rush and may prefer a short response, in the afternoon a longer response, and in the evening an even longer response. That preference may be stored by the system. Thus, the control circuitry may select a short response as a criteria associated with the user.

In another example, the user equipment device may receive a question from a user asking "What is the weather like?" The control circuitry may determine that the attributes associated with the user are the user's location and time of day. The control circuitry may further determine based on the time of the day that the user wants a short response. For example, the control circuitry may determine that a shorter response corresponds to only the high and low temperature and whether there is forecasted rain or snow. However, if the user is asking the same question in the evening, the control circuitry may determine based on the time of day and the user's location that the user wants a long response describing the weather for the evening and the next day.

The control circuitry may be configured to identify, based on the one or more attributes, a response template of a plurality of response templates previously assigned to the query template. For example, if the natural language query is received in the morning and the user prefers a short response in the morning, the control circuitry may compare all the available response templates and select one that is of a shortest length. For example, if the received natural language query is, "How long until my train arrives," the control circuitry may respond with "Five minutes" instead of a longer answer.

The control circuitry may be configured to generate the response to the natural language query based on the identified response template and the retrieved one or more search results. As described above, if the response template is just a name and the search result is "James Cameron," the control circuitry may just generate a response "James Cameron."

In some embodiments, the plurality of attributes associated with the user may include at least one of a plurality of characteristics associated with the user, a location of the user, a date associated with the user's location, and a time of day associated with the user's location, or another suitable attribute. Other attributes may be determined from data associated with the user. For example, the other attributes may include a current season of the year, whether a festival is going to fall on a particular date, and other facts of the day including past and future events that have happened or will happen on or around the date. Furthermore, the derived attributes may include birthdays associated with the user (e.g., the user's birthday or birthdays of the user's family members, friends, or other persons). This information may be stored in the user's profile. This information may be entered into the user's profile manually or received from another source (e.g., user's calendar, user's contact list or contact lists, or another suitable source).

In some embodiments, these attributes may be aggregated. For example, the control circuitry may use multiple attributes, such the user's age and a fact of the day, to select a response template. If the user is a child and it is the user's birthday, the control circuitry may respond in a child's voice and play the "Happy Birthday Song" in the background. In some embodiments, the attribute associated with the user may be the user's gender. For example, male users may prefer a female's voice to deliver a response. In these instances, the control circuitry may select a response template that uses a female voice to deliver a response.

In some embodiments, the attributes that are used by the control circuitry may be selected based on a respective weight associated with each attribute. Specifically, the control circuitry is configured to select, based on the selection criteria, one or more attributes of the plurality of attributes associated with the user. The control circuitry may determine a weight associated with each attribute of the plurality of attributes associated with the user and identify the one or more attributes based on the weight associated with each attribute. For example, each attribute may be stored in a database. Together with each attribute the database may include a weight associated with each attribute. The weights may be determined by the manufacturer, or may be adjustable by a user or a third party. In some embodiments, the weights may be randomized so the same attribute or attributes are not always selected.

In some embodiments, the weights of attributes may be modified automatically when an attribute is selected in order to ensure that the same attribute or attributes are not always selected. Specifically, the control circuitry may be further configured to adjust a corresponding weight associated with an attribute in response to the attribute being used to identify the response template. For example, if time of day is repeatedly used to select a template the system may be more machine-like and less human-like. Thus, using an attribute such as the user's location or the user's relative location (e.g., whether the user is at work, at home, at a friend's home or at another suitable location) may make the system more human-like.

In some embodiments, the control circuitry is configured to generate the response to the natural language query based on the identified response template and the retrieved one or more search results. The control circuitry may be configured to retrieve the identified attribute and perform a search based on the identified attribute and the one or more search results. Based on the search, the control circuitry may identify information associated with both the identified attribute and the one or more search results, and update the response to include the identified information. For example, if the identified attribute is location, and the user is asking about the weather, the control circuitry may search for weather events (past and future) in the location and add that information to the search. Thus, the control circuitry may return an answer: "It is forty-five degrees. Did you know that last year a big winter storm came through here causing the whole city to shut down?"

In some embodiments, the control circuitry may select specific attributes for use in the selection criteria. Specifically, the control circuitry may be configured to select, based on the selection criteria, the one or more attributes of the plurality of attributes associated with the user. The control circuitry may determine a time of day in the user's location, determine, based on the time of day, a relative length of response that the user prefers at the time of day, and add to the one or more attributes the relative length of response that the user prefers. For example, if the control circuitry is receiving user input in the evening, the control circuitry may select the response template that is the longest in delivering the response to the natural language query.

In some embodiments, the control circuitry may select a response template based on the relative length of the response template to other response templates. Specifically, the control circuitry is configured to identify, based on the one or more attributes, the response template of the plurality of response templates previously assigned to the query template. The control circuitry may select a response template based on the length of response that the user prefers. As described in the example above, if the user prefers short responses in the morning and longer response as the day progresses, the control circuitry may respond with just a single answer in the morning and longer answers as the day goes by.

In some embodiments, the following method may be used to identify the response template. Specifically, the control circuitry may be configured to identify, based on the one or more attributes, the response template from the plurality of response templates that have previously been assigned to the query template by retrieving, from a database, one or more attributes associated with the response template, comparing the one or more attributes associated with the response template with the one or more attributes of the plurality of attributes associated with the user, and based on the comparison, identifying the response template. For example, each response template may be associated with one or more attributes (e.g., length, format, or another suitable attribute). The control circuitry may compare those attributes with the user's preferred attributes (e.g., preference for a short response, preference for a specific format, or another suitable attribute). The control circuitry may select the response template that matches the most user attributes.

In some embodiments, the control circuitry may retrieve multiple search results based on a search. However, some search results may be preferable to the user. Thus, the control circuitry may select the more preferable results to deliver to the user. Specifically, the control circuitry may determine that a plurality of search results corresponds to the natural language query, determine, based on the past natural language queries received from the user, that one or more search results are preferable over other search results corresponding to the natural language query. Based on that determination, the control circuitry may generate a response to the natural language query based on the identified response template and the preferred one or more search results. For example, if the query is "When do the Yankees play," the control circuitry may determine that there are 20 Yankee games scheduled to be played in the next few months. However, the control circuitry may determine that the user prefers to know about one or two games that are to be played next. Thus, the control circuitry may generate a response based on the one or two games that are to be played next and not deliver the times associated with other games found.

In some embodiments, the control circuitry may be configured to generate response templates for received natural language query templates. Specifically, the control circuitry may be configured to receive a plurality of sample natural language queries and a corresponding plurality of sample responses, where each natural language query corresponds to one or more sample responses. The control circuitry may also be configured to generate a plurality of sample query templates based on the plurality of sample natural language queries and generate one or more response templates for each sample query template based on the one or more sample responses corresponding to the associated natural language query. For example if the control circuitry receives "Who directed Titanic," as natural language query and sample responses "James Cameron directed Titanic," "Titanic," and "James Cameron is the director of Titanic," the control circuitry may create three response templates that may be represented as <Result> <Action> <query data>, <Result>, and <Result> is <query data>.

In some aspects, systems and methods are described to provide for a natural language processing system that automatically generates an intelligent response to a natural language query based on one or more attributes associated with a device that receives the query. Specifically, the system may be implemented on a user equipment device that includes a user input interface. The user input interface may be configured to receive the natural language query. For example, the user input interface may receive the natural language query through a microphone or a keyboard associated with the user equipment device. It should be noted that the user input interface may be configured to receive the natural language query from any type of input device, including, but not limited to, mechanical motion devices, audio input devices, visual input devices, touch input devices, and other suitable input devices.

The user equipment device may also include control circuitry that may be configured to process the received natural language query in order to generate a smart response. Specifically, the control circuitry may be configured to receive, from the user input interface, the natural language query. For example, the user input interface may receive the natural language query in one of a number of formats (e.g., visual, audio, textual, or another suitable format). The user input interface may, upon receipt of the natural language query, process the query and convert the query into a format that can be further processed by the control circuitry (e.g., textual).

In order to respond to the natural language query, the control circuitry may need to match the received query to a query template that enables the control circuitry to determine which portions of the query are terms for searching and which terms are part of a question/inquiry phrase (e.g., what, why, where, or another suitable term). Thus, the control circuitry may be configured to determine which query template of a plurality of query templates corresponds to the natural language query. For example, the received natural language query may be "Who is the director of Titanic?" The control circuitry may determine that a matching template is "Who is" followed by variable data to be used in generating a response. Therefore, the control circuitry may search for "director of Titanic" with "Who is" being the question/inquiry phrase.

At this point, the control circuitry may execute a search to find an answer or answers to the natural language query. Specifically, the control circuitry may be configured to retrieve one or more search results corresponding to the natural language query. For example, as described above, if the natural query template is "Who is" followed by variable data, the control circuitry may perform a search based on the variable data. Specifically, the control circuitry may execute a search for "director of Titanic." The search may be a database search and/or an Internet search. It should be noted that any type of search engine either a commercial search engine and/or a specialized search engine may be used.

Additionally or optionally, the control circuitry may tailor the response to the user equipment device that received the natural language query. Specifically, the control circuitry may identify one or more attributes associated with the user equipment device. For example, the user equipment device may have connected speakers and a display screen. Thus, attributes of the device may include the ability to deliver audio responses, video responses, and a mix of both.

Based on the identified attributes, the control circuitry may select an appropriate query template (e.g., audio-only, video-only, audio-visual). Specifically, the control circuitry may select, based on the one or more attributes one of a first response template associated with an audio-only response to the natural language query, a second response template associated with a visual-only response to the natural language query, and a third response template associated with an audio-visual response to the natural language query. It should be noted that the first second and third templates are assigned to the natural language query template at an earlier time. For example, if the user equipment device that received the natural language query only has a speaker, but not a display screen, the control circuitry may select an audio-only response template. If the user equipment device has both a display screen and a speaker, then the control circuitry may select an audio-visual response template.

At this point, the control circuitry may generate the response to the natural language query based on the selected response template and the retrieved one or more search results. For example, the control circuitry receives a natural language query: "What action movies are playing tonight," and the user equipment device has a speaker and a display screen, the control circuitry may generate an audio portion of the response "Here is a list of action movies playing tonight" and generate a visual portion of the response by generating for display a list of action movies that are playing that night.

In some embodiments the one or more attributes associated with the user equipment device may include a plurality of characteristics associated with the user equipment device, a location of the user equipment device, a date associated with the location of the user equipment device, an orientation of the user equipment device, a time of day associated with the user equipment device, or another suitable attribute. For example, the orientation of the user equipment device may be used by the control circuitry to select a response template. Specifically, if the device is facing in a direction that the user may not be able to see the display screen of the device, the control circuitry may select an audio-only response template.

In some embodiments, the control circuitry may utilize the weight associated with each attribute to identify the attributes to use in selecting a response template. Specifically, the control circuitry is configured to identify the one or more attributes associated with the user equipment device. The control circuitry may be configured to retrieve a plurality of attributes associated with the user equipment device, determine a weight associated with each attribute of the plurality of attributes associated with the user equipment device, and identify the one or more attributes based on the weight associated with each attribute of the plurality of attributes. For example, an attribute of the user equipment device may be the volume setting. Thus, if the volume is set to a value that indicates that a response would not be audible to a user, the control circuitry may use the volume attribute as the highest weighted attribute and select a visual-only response.

In some embodiments, the control circuitry may use application data to identify attributes to use in selecting a response template. Specifically, the control circuitry is configured to identify the one or more attributes associated with the user equipment device. The control circuitry may be configured to identify an application of the user equipment device that the user interacted with last and add the application to the one or more identified attributes. For example, if the last accessed application is a fitness application, the control circuitry may determine that the user is exercising and may not be able to look at the display screen. Thus, the control circuitry may choose, based on the last application accessed, an audio-only response.

In some embodiments, the control circuitry may be used to generate different types of responses (e.g., visual-only, audio-only, audio-visual, or another suitable response type) from a received generic response template. Specifically, the control circuitry may receive a generic response template associated with the natural language query and determine whether the generic response template may be converted into at least one of an audio response template, a visual response template, and a mixed audio and visual response template. Based on determining that the generic response template can be converted into the audio response template, convert the generic response template into the first response template. Based on determining that the generic response template can be converted into the visual response template, convert the generic response template into the second response template. And based on determining that the generic response template can be converted into an audio-visual response template, convert the generic response template into the third response template.

For example, if the response template is "The following <genre> are playing tonight" followed by a list of shows, the control circuitry may determine that this template may be converted into an audio-only template because the words can be delivered via audio. The control circuitry may be configured to convert the same template into a visual-only template because all the words may be generated for display on a display screen. Likewise, the control circuitry may convert this template into an audio-visual template where the list of shows may be generated for display on a display screen and the rest of the response may be delivered via an audio channel (e.g., a speaker). However, if the response template calls for something to be displayed on the display screen (e.g., a request for a map) the control circuitry may not be able to generate an audio-only response based on that response template.

In some embodiments, the control circuitry may identify specific components of the user equipment device and add indications of those components to the list of attributes based on which the response template is to be selected. Specifically, the control circuitry is configured to identify the one or more attributes associated with the user equipment device. The control circuitry may be configured to determine that the user equipment device is associated with a speaker and a display and based on the determining, add an indication associated with the speaker and an indication associated with the display to the one or more attributes. For example, if the user equipment device includes a speaker and a display screen, the control circuitry may include those components in the one or more attributes.

In some embodiments, the system may, based on an existence of a display and a speaker, select an audio-visual response template. Specifically, the control circuitry is configured to select, based on the one or more attributes, one of the first response template, the second response template, and the third response template. The control circuitry may be configured to select the third response template based on the user equipment device being associated with a speaker and a display. For example, if a response template calls for a list of results to be delivered to a user, then the control circuitry may generate an audio portion describing the list and generate the list on a display screen. Specifically, the control circuitry may respond to a query of "what action movies are playing tonight" by generating via an audio channel "Here is a list of action movies playing tonight," and display the list on a display screen associated with the user equipment device.

In some embodiments, a user preference may override an automatic selection of a response template. Specifically, the control circuitry may be configured to identify a user that is associated with the natural language query and determine whether the user prefers to receive one of an audio-only response, a visual-only response, an audio-visual response, or another suitable response type from the user equipment device. Based on the determining, override the one or more attributes with the user's preference for the user equipment device. For example, the user may have a user equipment device in the kitchen that includes a speaker and a display screen. However, the user may only want to receive audio responses from that user equipment device because the user never looks at the display screen on that user equipment device. Thus, the control circuitry may receive and store a preference from the user that only audio responses are to be generated by that user equipment device. Therefore, the control circuitry may override the one or more attributes with the user's preference.

In some embodiments, the control circuitry, based on determining that the attributes have been overridden by a user's preference, select a response template based on that preference. Specifically, the control circuitry is configured to identify, based on the one or more attributes, the first response template, the second response template or the third response template. The control circuitry may be configured to select the first response template based on the user's preference for the user equipment device. As in the example above, if the user prefers an audio-only response template, the control circuitry may select an audio-only response template based on that preference.

In some embodiments, the control circuitry may add the user equipment device's orientation to the one or more attributes. Specifically, the control circuitry is configured to identify the one or more attributes associated with the user equipment device. The control circuitry may determine an orientation of the user equipment device and add the orientation of the user equipment device to the one or more attributes. For example, if the orientation of the user equipment device is vertical, the control circuitry may determine that it is in a user's pocket or a bag, where the user may not be able to see the display screen. Thus, the control circuitry may choose an audio-only response template based on that determination.

DETAILED DESCRIPTION

Systems and methods are provided herein for a natural language processing system that automatically generates an intelligent response to a natural language query based on one or more attributes associated with a user. Specifically, the generated intelligent responses would enable the system to be more human-like and less monotonous.

For example, a user may ask: "What is the weather like?" In response, the system may determine that it is currently 7:00 AM at the location where the user is, and based on that determination, give the user basic weather information (e.g., number of degrees and whether it may rain or snow). However, if the system determines that it is currently 7:00 PM at the location where the user is, the system may respond with an extended forecast (e.g., number of degrees now and in the morning, whether it is raining now or will rain in the morning, or other suitable information). In some embodiments the system may generate for display to the user, an extended forecast, for example, for a week.

Figure 1:
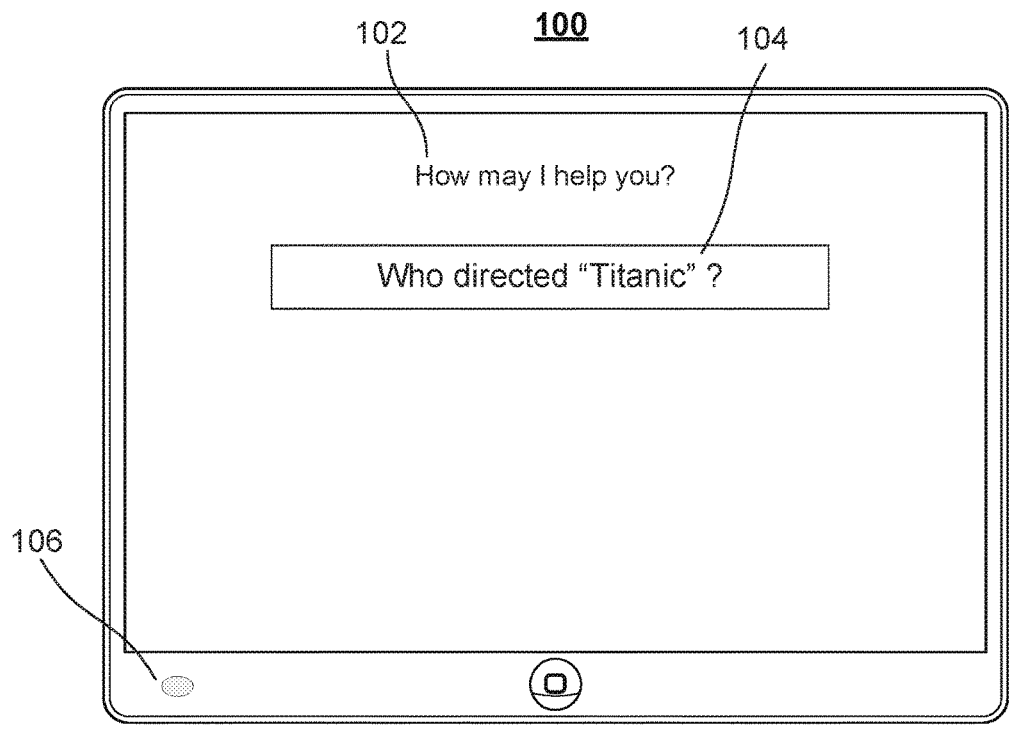
FIG. 1 shows an illustrative embodiment of a display screen that may be used to receive a natural language query from a user, in accordance with some embodiments of the disclosure.

FIG. 1 illustrates a display screen that may be used to receive input from a user of a natural language query. Display 100 of FIG. 1 may include prompt 102 that indicates to a user that the user equipment device is ready to receive the natural language query. Prompt 102 may be generated for display as shown in FIG. 1. However, prompt 102 may be generated for audio transmission through, for example, a speaker. Area 104 may be used to display a textual representation of the user's input. User input may be received through microphone 106 and then, for example, transcoded into textual data exemplified in area 104.

Figure 2:
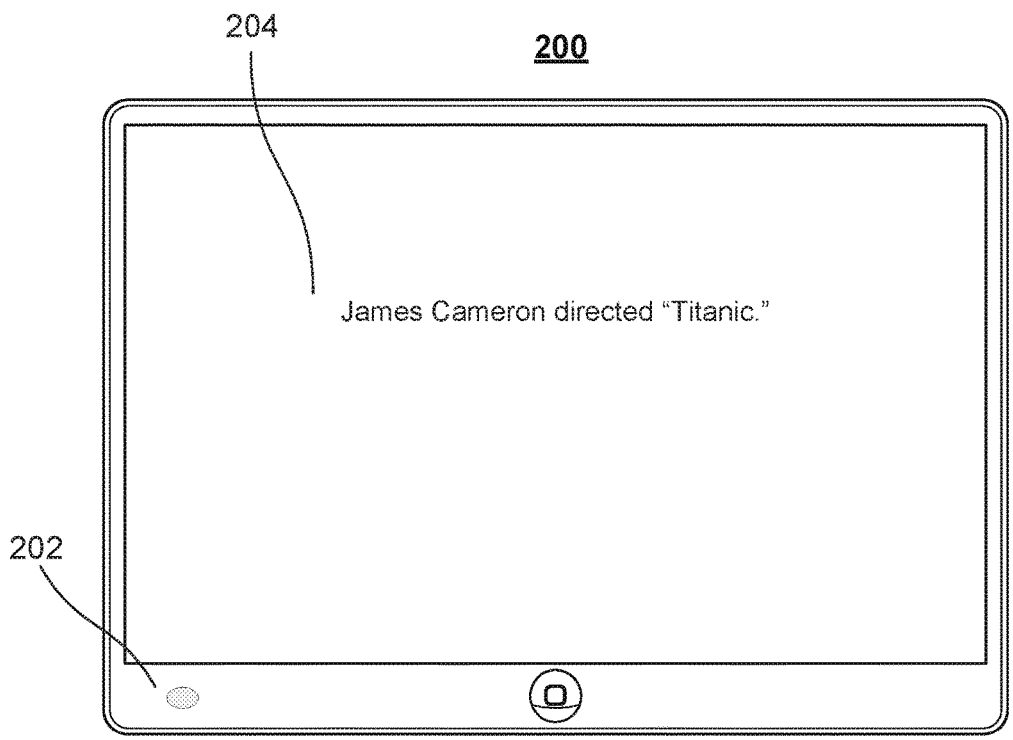
FIG. 2 shows an illustrative embodiment of a display screen that may be used to provide a response to the natural language query based on an attribute associated with a user, in accordance with some embodiments of the disclosure.
Figure 3:
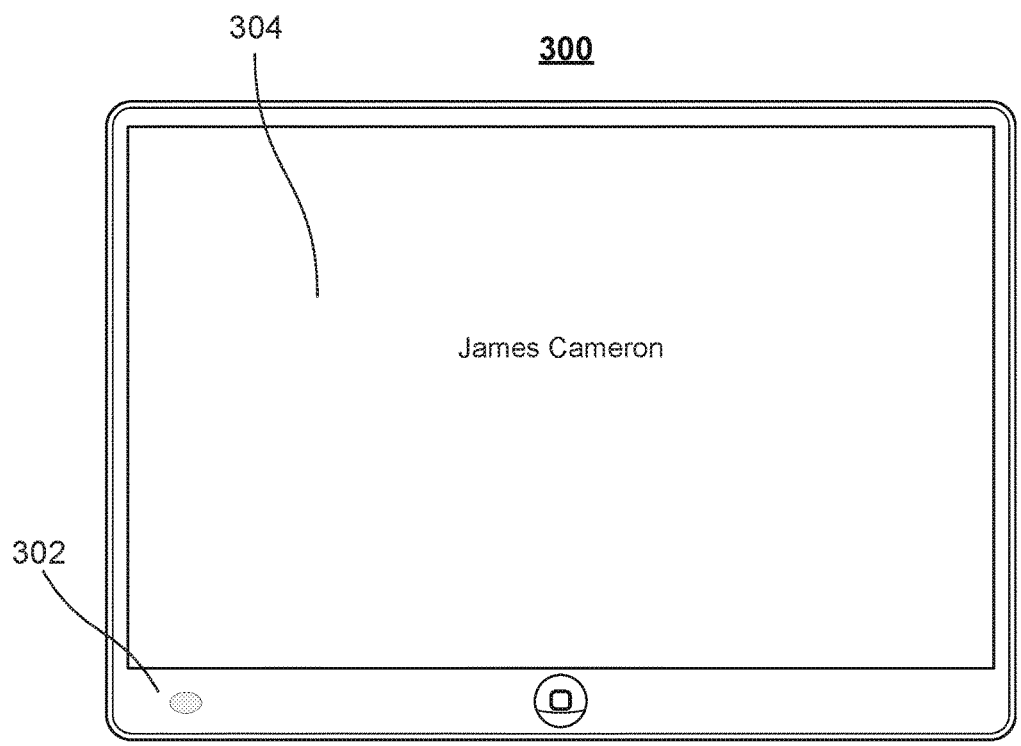
FIG. 3 shows another illustrative embodiment of a display screen that may be used to provide a response to the natural language query based on an attribute associated with a user, in accordance with some embodiments of the disclosure.
Figure 4:
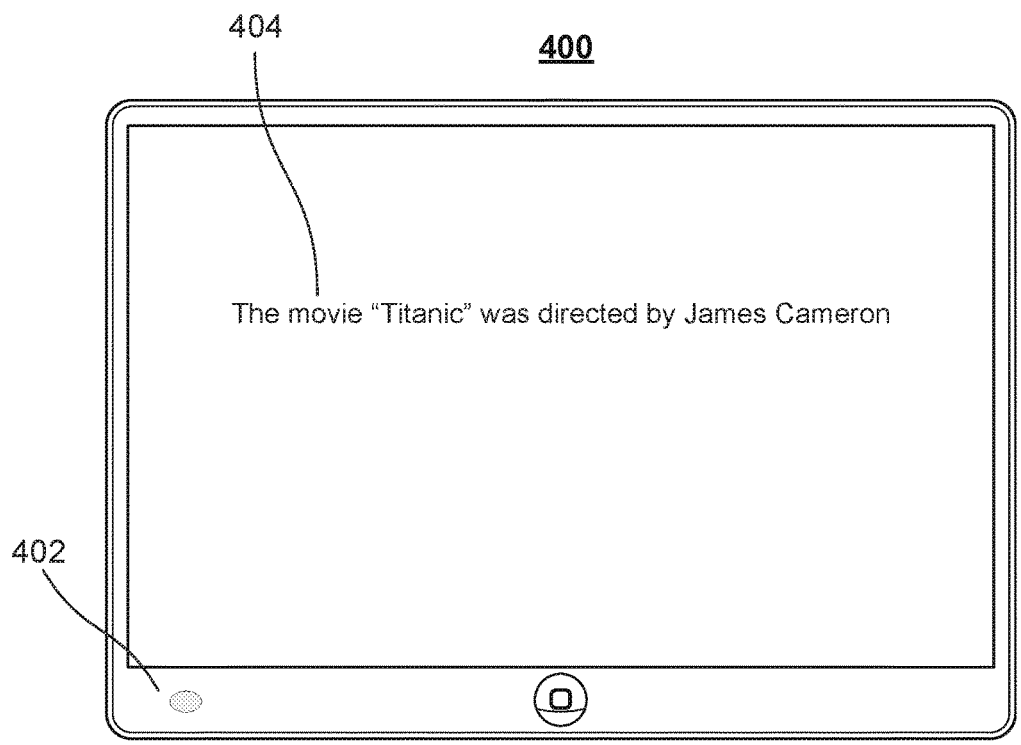
FIG. 4 shows yet another illustrative embodiment of a display screen that may be used to provide a response to the natural language query based on an attribute associated with a user, in accordance with some embodiments of the disclosure.

FIG. 1 illustrates that the user equipment has received the natural language query "Who directed Titanic." In response, the control circuitry within the user equipment device may retrieve a natural language query template, the answer to the natural language query, and a number of response templates associated with the natural language query template. Answers based on different response templates are illustrated in FIGS. 2-4. Display 200 of FIG. 2 illustrates one response template that may be used by the control circuitry in responding to the natural language query. The user device of FIG. 2 may be the same device as illustrated in FIG. 1 and include a microphone 202. However, the display screen of the device may display response 204 'James Cameron directed "Titanic",' corresponding to the answer to the natural language query using one template.

Display 300 of FIG. 3 illustrates the same user equipment device, but displaying a response to the natural language query based on a different response template. Microphone 304 is still present for further user input and response 304 "James Cameron" is display to illustrate the use of a different response template. Display 400 of FIG. 4 illustrates the same user equipment with the same microphone 402, albeit with response 404 which is based on a different response template. As a result, the system is able to present different responses at different times and under different circumstances in order to create a more human-like system.

Figure 5:
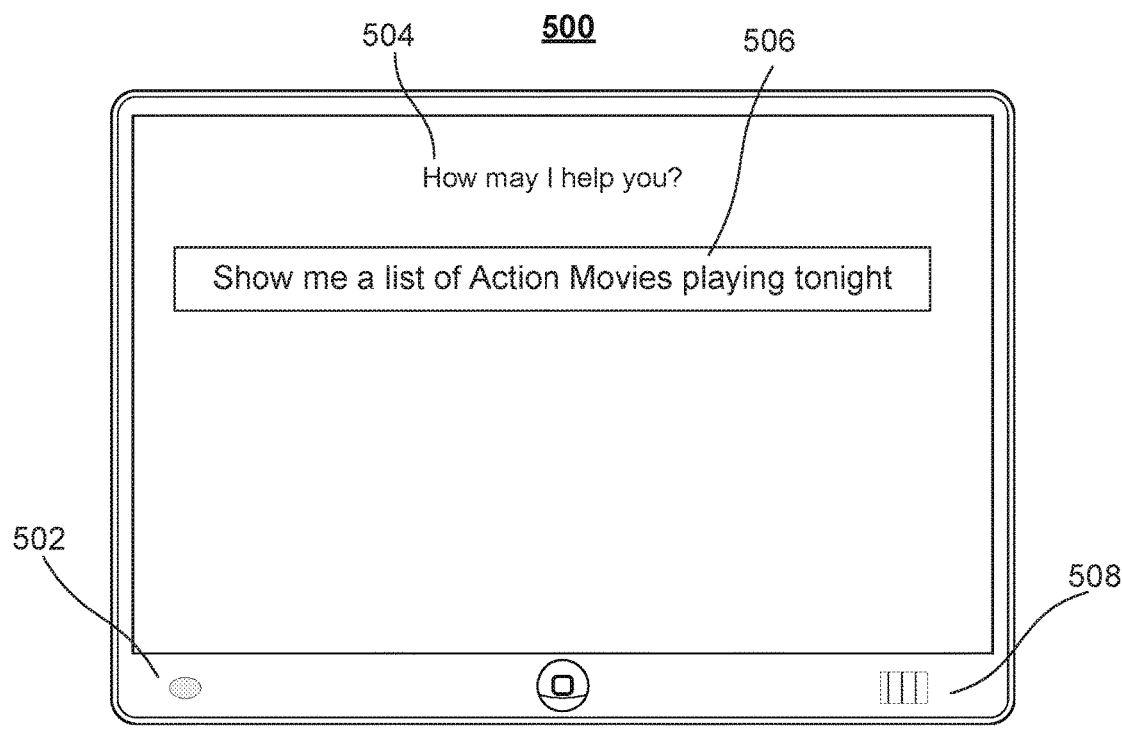
FIG. 5 shows an illustrative embodiment of a display screen that may be used to receive a natural language query from a user, in accordance with some embodiments of the disclosure.
Figure 6:
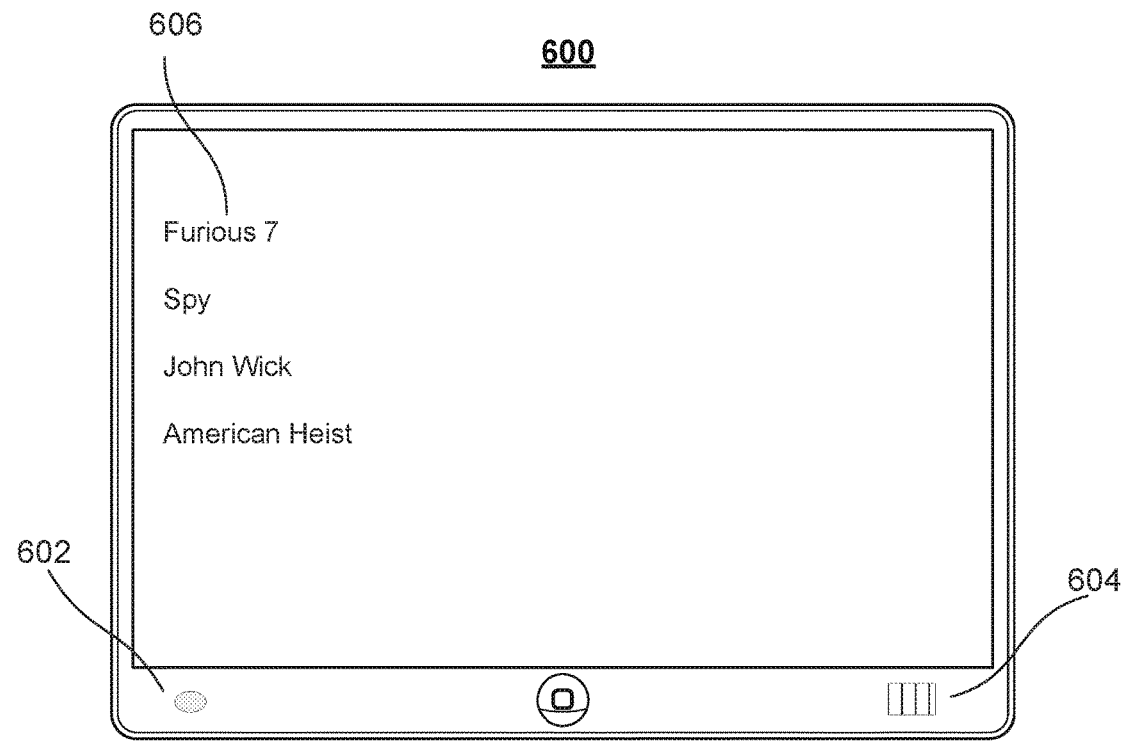
FIG. 6 shows an illustrative embodiment of a display screen that may be used to provide a response to the natural language query based on an attribute associated with a user equipment device, in accordance with some embodiments of the disclosure.

In some embodiments, the system may select a response template based on attributes of the user equipment device. Display 500 of FIG. 5 illustrates a system that enables a user to input (e.g., through microphone 502) the natural language query. Specifically, prompt 504 may be displayed on the display screen 500. Additionally or alternatively, prompt 504 may be output in an audio format through speaker 508. Display 600 of FIG. 6 may represent the same user equipment device as illustrated in FIG. 5. Area 504 may include a textual representation of a natural language query "Show me a list of action movies playing tonight." The control circuitry of the user equipment device may convert any input received from microphone 502 into textual representation displayed. Display 600 of FIG. 6 may illustrate a display screen of the same user equipment device as device of FIG. 5 Microphone 602 and speaker 604 may represent the same component as in FIG. 5. However, display 600 may be displaying a list of action movies that are playing tonight and use speaker 604 to generate an audio portion of the response "The following action movies are playing tonight."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 7:
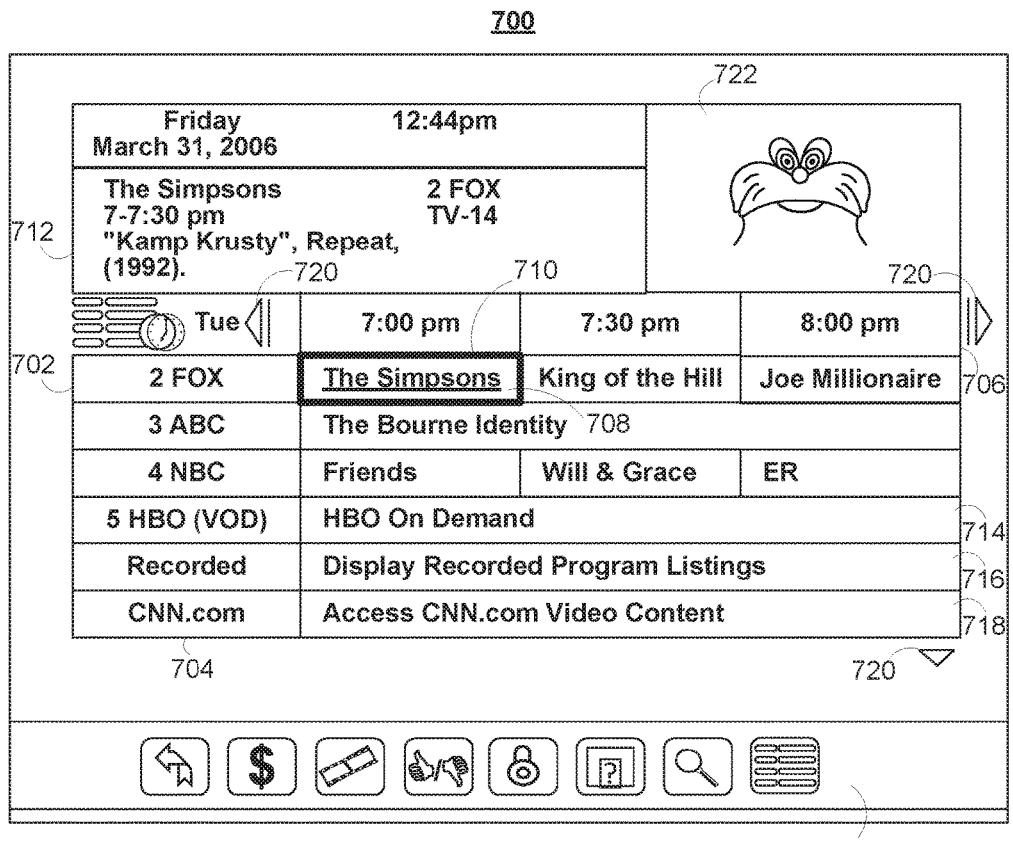
FIG. 7 shows an illustrative embodiment of a display screen that may be used to provide media guidance application listings, in accordance with some embodiments of the disclosure.
Figure 8:
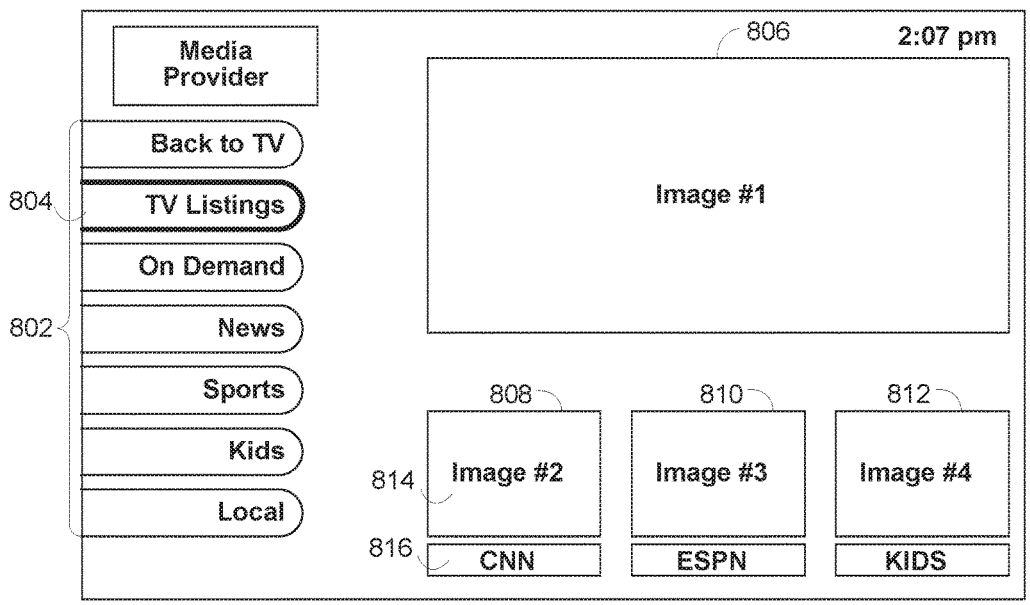
FIG. 8 shows another illustrative embodiment of a display screen that may be used to provide media guidance application listings, in accordance with some embodiments of the disclosure.

FIGS. 7-8 show illustrative display screens that may be used to provide media guidance data. The display screens shown in FIGS. 7-8 may be implemented on any suitable user equipment device or platform. While the displays of FIGS. 7-8 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 7 shows illustrative grid of a program listings display 700 arranged by time and channel that also enables access to different types of content in a single display. Display 700 may include grid 702 with: (1) a column of channel/content type identifiers 704, where each channel/content type identifier (which is a cell in the column) identifies a different channel or content type available; and (2) a row of time identifiers 706, where each time identifier (which is a cell in the row) identifies a time block of programming. Grid 702 also includes cells of program listings, such as program listing 708, where each listing provides the title of the program provided on the listing's associated channel and time. With a user input device, a user can select program listings by moving highlight region 710. Information relating to the program listing selected by highlight region 710 may be provided in program information region 712. Region 712 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 702 may provide media guidance data for non-linear programming including on-demand listing 714, recorded content listing 716, and Internet content listing 718. A display combining media guidance data for content from different types of content sources is sometimes referred to as a "mixed-media" display. Various permutations of the types of media guidance data that may be displayed that are different than display 700 may be based on user selection or guidance application definition (e.g., a display of only recorded and broadcast listings, only on-demand and broadcast listings, etc.). As illustrated, listings 714, 716, and 718 are shown as spanning the entire time block displayed in grid 702 to indicate that selection of these listings may provide access to a display dedicated to on-demand listings, recorded listings, or Internet listings, respectively. In some embodiments, listings for these content types may be included directly in grid 702. Additional media guidance data may be displayed in response to the user selecting one of the navigational icons 720. (Pressing an arrow key on a user input device may affect the display in a similar manner as selecting navigational icons 720.)

Display 700 may also include video region 722, and options region 726. Video region 722 may allow the user to view and/or preview programs that are currently available, will be available, or were available to the user. The content of video region 722 may correspond to, or be independent from, one of the listings displayed in grid 702. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 726 may allow the user to access different types of content, media guidance application displays, and/or media guidance application features. Options region 726 may be part of display 700 (and other display screens described herein), or may be invoked by a user by selecting an on-screen option or pressing a dedicated or assignable button on a user input device. The selectable options within options region 726 may concern features related to program listings in grid 702 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 10. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 8. Video mosaic display 800 includes selectable options 802 for content information organized based on content type, genre, and/or other organization criteria. In display 800, television listings option 804 is selected, thus providing listings 806, 808, 810, and 812 as broadcast program listings. In display 800 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 808 may include more than one portion, including media portion 814 and text portion 816. Media portion 814 and/or text portion 816 may be selectable to view content in full-screen or to view information related to the content displayed in media portion 814 (e.g., to view listings for the channel that the video is displayed on).

The listings in display 800 are of different sizes (i.e., listing 806 is larger than listings 808, 810, and 812), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 9:
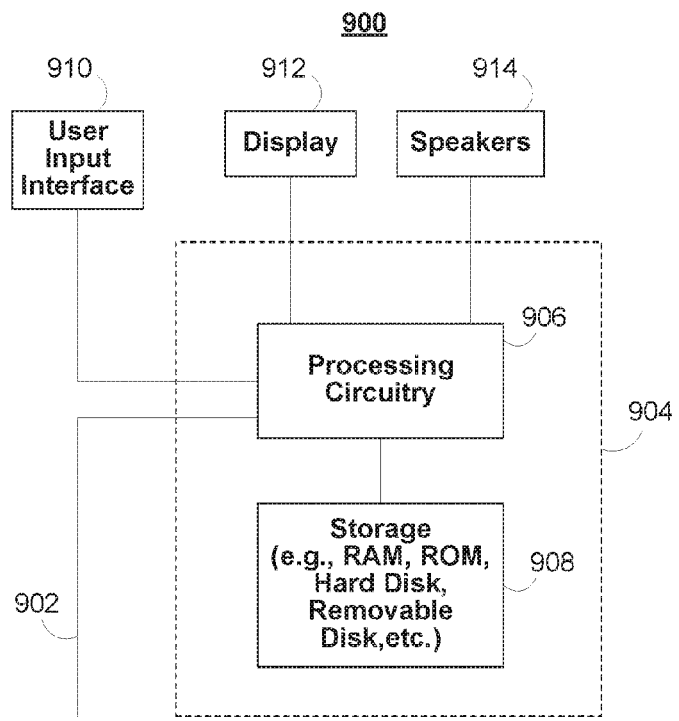
FIG. 9 is a block diagram of an illustrative device in accordance with some embodiments of the disclosure.

Users may access content and the media guidance application (and its display screens described above and below) from one or more of their user equipment devices. FIG. 9 shows a generalized embodiment of illustrative user equipment device 900. More specific implementations of user equipment devices are discussed below in connection with FIG. 10. User equipment device 900 may receive content and data via input/output (hereinafter "I/O") path 902. I/O path 902 may provide content (e.g., broadcast programming, on-demand programming, Internet content, content available over a local area network (LAN) or wide area network (WAN), and/or other content) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below). I/O functions may be provided by one or more of these communications paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for a media guidance application stored in memory (i.e., storage 908). Specifically, control circuitry 904 may be instructed by the media guidance application to perform the functions discussed above and below. For example, the media guidance application may provide instructions to control circuitry 904 to generate the media guidance displays. In some implementations, any action performed by control circuitry 904 may be based on instructions received from the media guidance application.

In client-server based embodiments, control circuitry 904 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and downconverting content into the preferred output format of the user equipment 900. Circuitry 904 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

A user may send instructions to control circuitry 904 using user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of user equipment device 900. For example, display 912 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 912 may be HDTV-capable. In some embodiments, display 912 may be a 3D display, and the interactive media guidance application and any suitable content may be displayed in 3D. A video card or graphics card may generate the output to the display 912. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 904. The video card may be integrated with the control circuitry 904. Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914.

The guidance application may be implemented using any suitable architecture. For example, it may be a stand-alone application wholly-implemented on user equipment device 900. In such an approach, instructions of the application are stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to generate any of the displays discussed herein. Based on the processed instructions, control circuitry 904 may determine what action to perform when input is received from input interface 910. For example, movement of a cursor on a display up/down may be indicated by the processed instructions when input interface 910 indicates that an up/down button was selected.

In some embodiments, the media guidance application is a client-server based application. Data for use by a thick or thin client implemented on user equipment device 900 is retrieved on-demand by issuing requests to a server remote to the user equipment device 900. In one example of a client-server based guidance application, control circuitry 904 runs a web browser that interprets web pages provided by a remote server. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on equipment device 900. This way, the processing of the instructions is performed remotely by the server while the resulting displays are provided locally on equipment device 900. Equipment device 900 may receive inputs from the user via input interface 910 and transmit those inputs to the remote server for processing and generating the corresponding displays. For example, equipment device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to equipment device 900 for presentation to the user.

In some embodiments, the media guidance application is downloaded and interpreted or otherwise run by an interpreter or virtual machine (run by control circuitry 904). In some embodiments, the guidance application may be encoded in the ETV Binary Interchange Format (EBIF), received by control circuitry 904 as part of a suitable feed, and interpreted by a user agent running on control circuitry 904. For example, the guidance application may be an EBIF application. In some embodiments, the guidance application may be defined by a series of JAVA-based files that are received and run by a local virtual machine or other suitable middleware executed by control circuitry 904. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
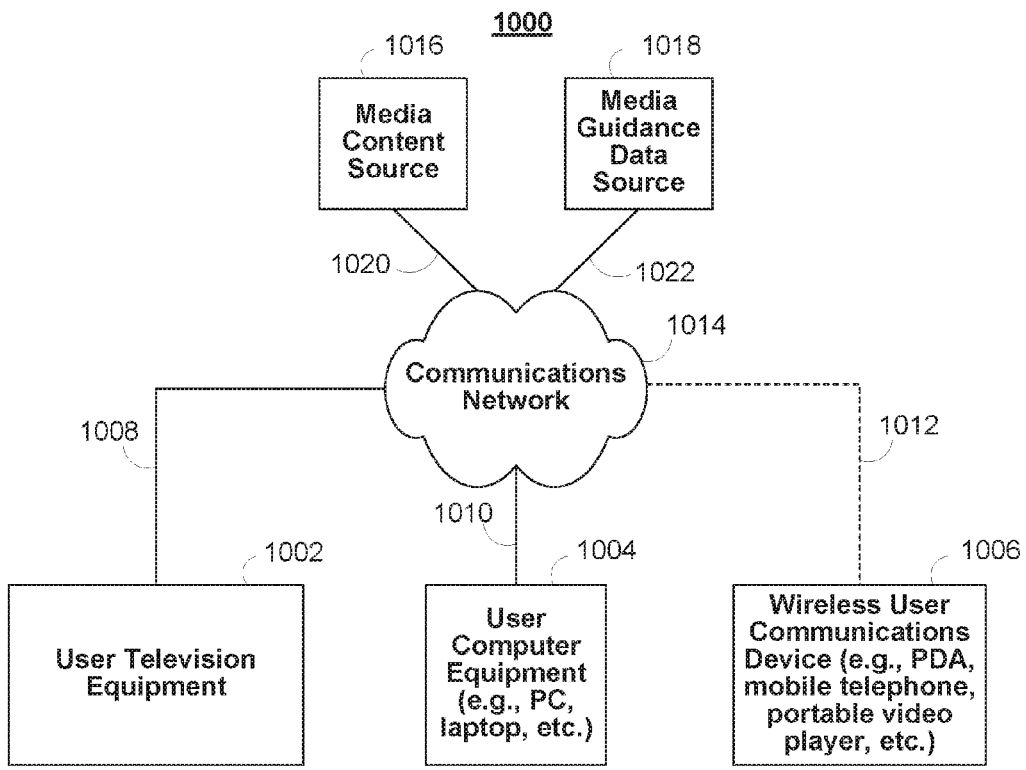
FIG. 10 is a block diagram of an illustrative media system, in accordance with some embodiments of the disclosure.

User equipment device 900 of FIG. 9 can be implemented in system 1000 of FIG. 10 as user television equipment 1002, user computer equipment 1004, wireless user communications device 1006, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 9 may not be classified solely as user television equipment 1002, user computer equipment 1004, or a wireless user communications device 1006. For example, user television equipment 1002 may, like some user computer equipment 1004, be Internet-enabled allowing for access to Internet content, while user computer equipment 1004 may, like some television equipment 1002, include a tuner allowing for access to television programming. The media guidance application may have the same layout on various different types of user equipment or may be tailored to the display capabilities of the user equipment. For example, on user computer equipment 1004, the guidance application may be provided as a web site accessed by a web browser. In another example, the guidance application may be scaled down for wireless user communications devices 1006.

In system 1000, there is typically more than one of each type of user equipment device but only one of each is shown in FIG. 10 to avoid overcomplicating the drawing. In addition, each user may utilize more than one type of user equipment device and also more than one of each type of user equipment device.

In some embodiments, a user equipment device (e.g., user television equipment 1002, user computer equipment 1004, wireless user communications device 1006) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 may be one or more networks including the Internet, a mobile phone network, mobile voice or data network (e.g., a 4G or LTE network), cable network, public switched telephone network, or other types of communications network or combinations of communications networks. Paths 1008, 1010, and 1012 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1012 is drawn with dotted lines to indicate that in the exemplary embodiment shown in FIG. 10 it is a wireless path and paths 1008 and 1010 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 1008, 1010, and 1012, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1014.

System 1000 includes content source 1016 and media guidance data source 1018 coupled to communications network 1014 via communication paths 1020 and 1022, respectively. Paths 1020 and 1022 may include any of the communication paths described above in connection with paths 1008, 1010, and 1012. Communications with the content source 1016 and media guidance data source 1018 may be exchanged over one or more communications paths, but are shown as a single path in FIG. 10 to avoid overcomplicating the drawing. In addition, there may be more than one of each of content source 1016 and media guidance data source 1018, but only one of each is shown in FIG. 10 to avoid overcomplicating the drawing. (The different types of each of these sources are discussed below.) If desired, content source 1016 and media guidance data source 1018 may be integrated as one source device. Although communications between sources 1016 and 1018 with user equipment devices 1002, 1004, and 1006 are shown as through communications network 1014, in some embodiments, sources 1016 and 1018 may communicate directly with user equipment devices 1002, 1004, and 1006 via communication paths (not shown) such as those described above in connection with paths 1008, 1010, and 1012.

Content source 1016 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1016 may be the originator of content (e.g., a television broadcaster, a Webcast provider, etc.) or may not be the originator of content (e.g., an on-demand content provider, an Internet provider of content of broadcast programs for downloading, etc.). Content source 1016 may include cable sources, satellite providers, on-demand providers, Internet providers, over-the-top content providers, or other providers of content. Content source 1016 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1018 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1018 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1018 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1018 may provide user equipment devices 1002, 1004, and 1006 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 908, and executed by control circuitry 904 of a user equipment device 900. In some embodiments, media guidance applications may be client-server applications where only a client application resides on the user equipment device, and server application resides on a remote server. For example, media guidance applications may be implemented partially as a client application on control circuitry 904 of user equipment device 900 and partially on a remote server as a server application (e.g., media guidance data source 1018) running on control circuitry of the remote server. When executed by control circuitry of the remote server (such as media guidance data source 1018), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 1002, 1004, and 1006 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1000 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 10.

In one approach, user equipment devices may communicate with each other within a home network. User equipment devices can communicate with each other directly via short-range point-to-point communication schemes described above, via indirect paths through a hub or other similar device provided on a home network, or via communications network 1014. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1016 to access content. Specifically, within a home, users of user television equipment 1002 and user computer equipment 1004 may access the media guidance application to navigate among and locate desirable content. Users may also access the media guidance application outside of the home using wireless user communications devices 1006 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1014. These cloud resources may include one or more content sources 1016 and one or more media guidance data sources 1018. In addition or in the alternative, the remote computing sites may include other user equipment devices, such as user television equipment 1002, user computer equipment 1004, and wireless user communications device 1006. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1004 or wireless user communications device 1006 having content capture feature. Alternatively, the user can first transfer the content to a user equipment device, such as user computer equipment 1004. The user equipment device storing the content uploads the content to the cloud using a data transmission service on communications network 1014. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 9.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 11:
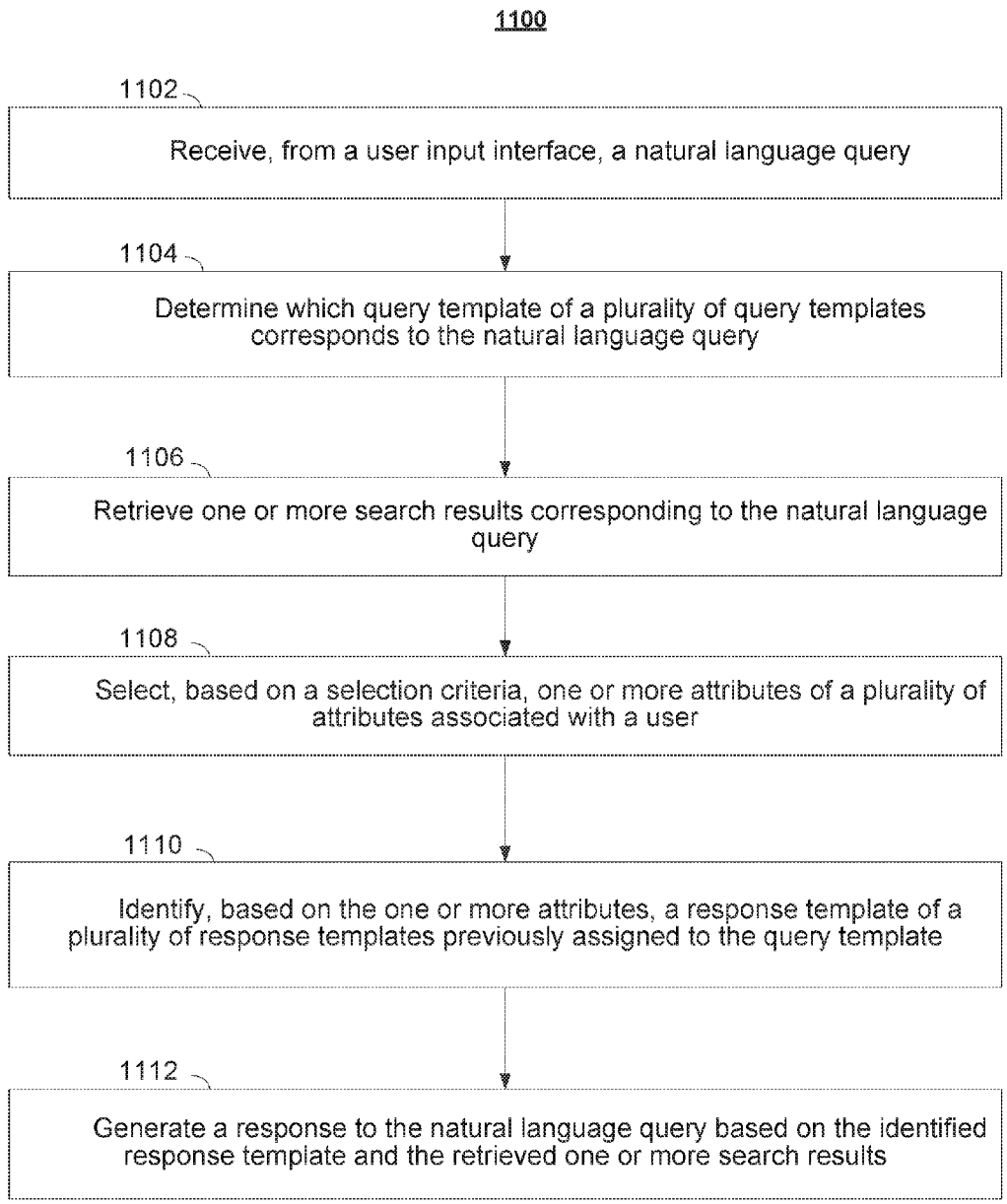
FIG. 11 depicts an illustrative process for generating a response to a natural language query based on one or more user attributes, in accordance with some embodiments of this disclosure.

In some embodiments control circuitry 904 generates a response to a natural language query as described by process 1100 of FIG. 11. At step 1102, the control circuitry receives, from a user input interface, a natural language query. As described above user input interface 910 may be used to receive the natural language query. For example, a user input interface may include a remote control, mouse, trackball, keypad, keyboard, touch screen, touchpad, stylus input, joystick, voice recognition interface, or another suitable device. The natural language query may then be transmitted from the user input interface to control circuitry 904 through an I/O path (e.g., I/O path 902).

In some embodiments, the control circuitry may be located on one device and a user input interface may be located on another device. For example, a user input interface may be located on a user equipment device (e.g., user television equipment 1002, user equipment 1004, or wireless user communications device 1006), but the control circuitry that processes the query may be located away from the user equipment device (e.g., at media content source 1016, or media guidance data source 1022). The user equipment device At step 1104, control circuitry 904 determines which query template of a plurality of query templates corresponds to the natural language query. As referred to herein, the term "query template" refers to a generalized template for a specific type of query. For example, a basic query template may be "Show me < . . . >," where the dots represent what the user wants to be shown. A more complete query template may be "Show me < . . . > directed by < . . . >. Thus, a natural language query "Show me movies directed by James Cameron will fit this query template. It should be noted that these two query templates are used as examples and other more complex query templates may be used by the system described.

Figure 12:
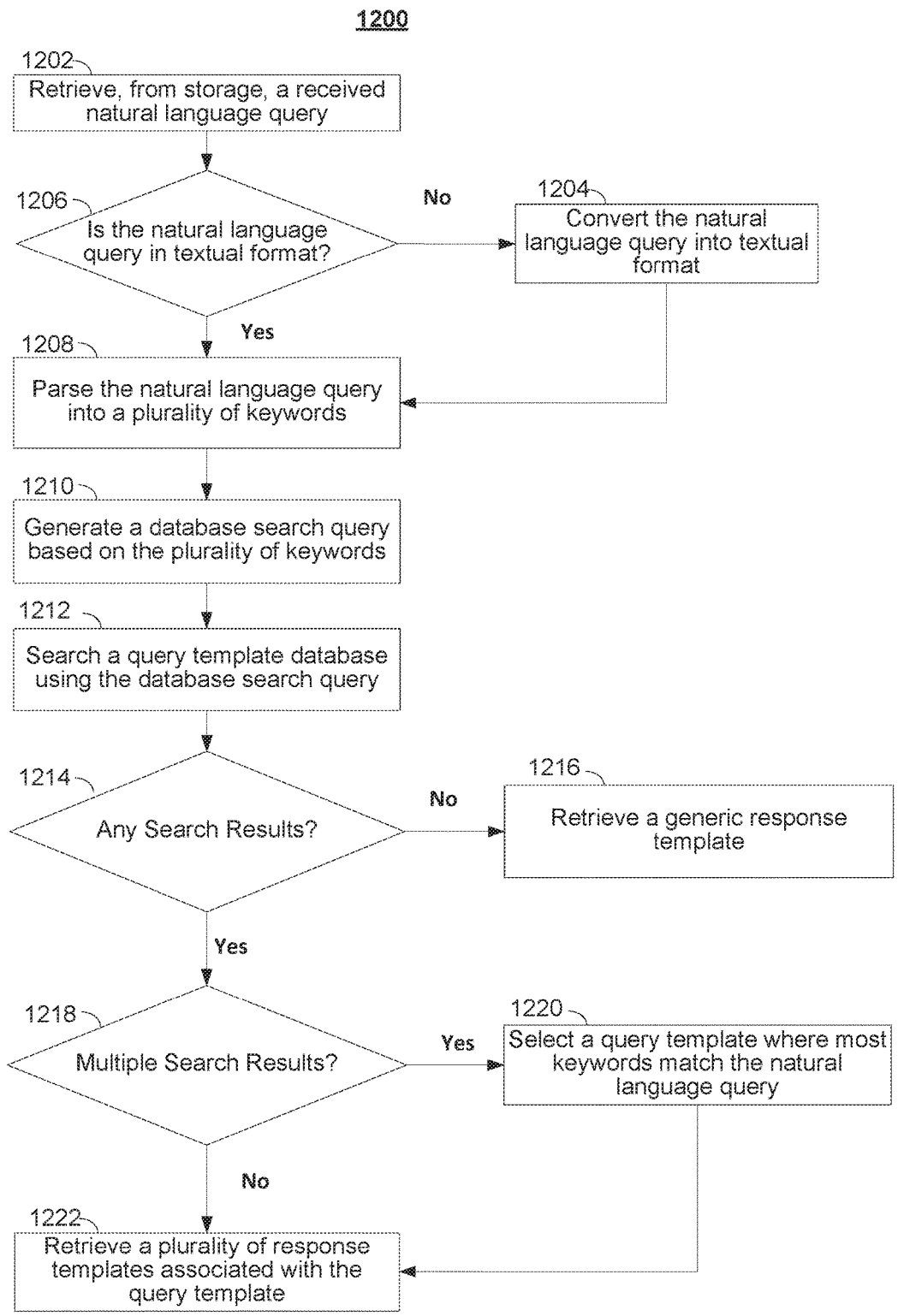
FIG. 12 depicts an illustrative process for identifying a plurality of response templates for a natural language query, in accordance with some embodiments of this disclosure.

Process 1200 of FIG. 12 is one illustration of how control circuitry 904 may determine which query template of a plurality of query templates corresponds to the natural language query. At step 1202, control circuitry 904 retrieves, from storage, (e.g., storage 908) a received natural language query. It should be noted that the control circuitry may retrieve the natural language query from storage on a different device. For example, the control circuitry that is retrieving the query may reside on a user equipment device (e.g., user television equipment 1008, user computer equipment 1004, or wireless user communications device 1006) and the query may be stored on a server (e.g., at media content source 1016 and/or media guidance data source 1018). Thus, the control circuitry may retrieve the natural language query from a remote location.

At step 1206, control circuitry 904 determine whether the natural language query is in textual format. If the textual query is stored in a file, the control circuitry may determine the type of file based on either content of the file or file extension. If the natural language query is not in textual format, at step 1204, control circuitry 904 converts the natural language query into textual format. The control circuitry may perform the conversion using any available converter. For example, the natural language query may be in an audio format (e.g., received from the user via a microphone). The control circuitry may convert the natural language query into a textual format. It should be noted that in some embodiments the natural language query may be converted into a textual format at an earlier time and the conversion may be performed by the user input interface (e.g., user input interface 910).

At step 1208, control circuitry 904 parses the natural language query into a plurality of keywords. For example, the control circuitry may parse the natural language query into words. Alternatively or additionally the control circuitry may parse portions the natural language query into known word combinations. For example, "directed by" would be one keyword for this purpose. Likewise, "show me" would be one keyword. Thus, control circuitry may parse the natural language query "Show me movies directed by James Cameron" into terms "Show me," "movies," "directed by," and "James Cameron."

At step 1210, control circuitry 904 generates a database search query based on the plurality of keywords. The control circuitry may first determine what kind of a database it is communicating with and then based on that use an appropriate connection protocol and query language. However, the query may include all or some of the keywords. At step 1212, control circuitry 904 searches a query template database using the database search query. It should be noted that the database may be located locally on the user equipment device (e.g., device 1002, 1004, or 1006) or remotely at media content source 1016 and/or media guidance data source 1018.

At step 1214, control circuitry 904 determines whether any search results have been found. In other words, the control circuitry determines whether any query templates correspond to the natural language query. If no search results are found control circuitry 904 retrieves a generic response template and process 1200 ends. If at least one search result is found, process 1200 moves to step 1218, where control circuitry 904 determines whether multiple search results have been found. In other words, the control circuitry determines whether more thane one query template matches the natural language query. To continue with the example above, at least three templates may match "Show me movies directed by James Cameron." A query template "Show me < . . . >" may match the natural language query along with "< . . . > directed by < . . . >" and "Show me < . . . > directed by < . . . >.

If control circuitry 904 determines that multiple search results match the natural language query, process 1200 moves to step 1220. At step, 1220 control circuitry 904 selects a query template with most keywords matching the natural language query. For example, the control circuitry may select a query template that matches most keywords. To continue with the example above the control circuitry may select "Show me < . . . > directed by < . . . >" template because both "show me" and "directed by" keywords match the template instead of only one keyword matching each of the other two templates.

At Step 1222, control circuitry 904 retrieves a plurality of response templates associated with the query template. For example, each query template may have associated response templates stored in a database. The control circuitry may retrieve those templates as part of step 1222. Response templates associated with query template "Show me < . . . > directed by < . . . >" may include just a list of entities, a template that generates for display or for audio output "Here is a list of <data from the natural language query after the term "Show me" and before the term "directed by"> directed by <data from the natural language query after term "directed by">.

It is contemplated that the descriptions of FIG. 12 may be used with any other embodiment of this disclosure. In addition, the descriptions described in relation to the process of FIG. 12 may be done in alternative orders or in parallel to further the purposes of this disclosure. For example, control circuitry 904 may submit multiple queries to the database in parallel, or it may submit multiple queries to a plurality of similar databases in order to reduce lag and speed the execution of the process. Furthermore, it should be noted that the process of FIG. 12 may be implemented on a combination of appropriately configured software and hardware, and that any of the devices or equipment discussed in relation to FIGS. 9-10 could be used to implement one or more portions of the process.

When control circuitry determines a query template as part of step 1104 of FIG. 11, process 1100 moves to step 1106. At step 1106, control circuitry 904 retrieves one or more search results corresponding to the natural language query. The control circuitry may determine a search query based on the query template. To continue with example above, "show me" may be excluded from the search because it is part of the template. So the search string may include terms such as "movie," "directed," and "James Cameron." When the search results are retrieved, the control circuitry may extract movie titles from the results or this can be done by another system before the results reach the control circuitry.

Figure 13:
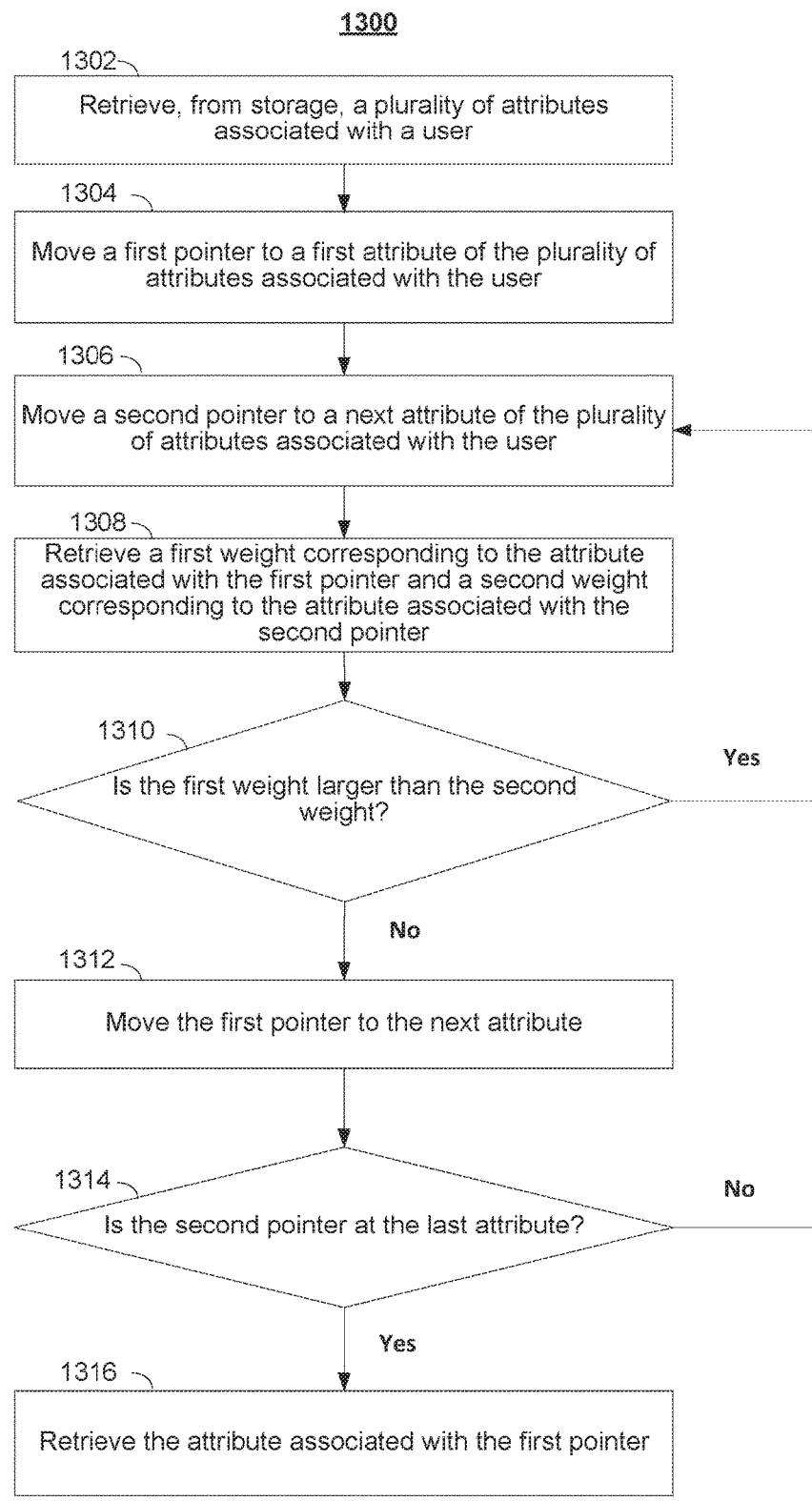
FIG. 13 depicts an illustrative process for identifying an attribute associated with a user based on the weight associated with that attribute, in accordance with some embodiments of this disclosure.

At step 1108, control circuitry 904 selects, based on a selection criteria, one or more attributes of a plurality of attributes associated with a user. For example, process 1300 of FIG. 13 illustrates one possible method of selecting the one or more attributes. At step 1302, control circuitry 904 retrieves, from storage (e.g., storage 908), a plurality of attributes associated with a user. It should be noted that control circuitry 904 may retrieve the attributes associated with the user from storage located at a remote device. For example, control circuitry 904 may retrieve attributes associated with the user from media content source 1016 and/or media guidance data source 1018 via communications network 1014. Attributes associated with users may be stored in a database on a server and cached locally to a user equipment device as required.

At this point, the control circuitry begins to iterate through all the attributes in order to find an attributes with the highest weight. At step 1304, control circuitry 904 moves a pointer to a first attribute of the plurality of attributes associated with the user. The control circuitry may use the first pointer to initially point at the first attributes in the plurality of attributes and as the process proceeds to point at the attribute with the highest weight.

At step 1306, control circuitry 904 moves a second pointer to a next attribute of the plurality of attributes associated with the user. Initially, the control circuitry uses the second pointer to point to a second attribute in the plurality of attributes. As the process moves along, the control circuitry may use the second pointer to iterate through all the attributes and then assign the first pointer to the higher weighted attribute as the iteration progresses.

At this point, the control circuitry retrieves a first pair of weights (associated with the first attribute and the second attribute) to begin the comparison. Specifically, at step 1308, the control circuitry retrieves a first weight corresponding to the attribute associated with the first pointer and a second weight corresponding to the attribute associated with the second pointer. Both the first weight and the second weight may be retrieved from storage 908. Additionally or alternatively, the weights and the user attributes may be stored remotely from the control circuitry. Specifically, the weights and the user attributes may be stored at media content source 1016 and/or media guidance data source 1018 and may be retrieved via communications network 1014. It should be noted that the weights and user attributes may be stored remotely as described an also cached locally at the device where the control circuitry resides.

At step 1310, control circuitry 904 determines whether the first weight is larger than the second weight. If the first weight is larger than the second weight then process 1300 moves to step 1306 where the second pointer is set to the next attribute in the plurality and the process moves again as described above. However, if the first weight is not larger than the second weight, then process 1300 moves to step 1312, where control circuitry 904 moves the first pointer to the next attribute. Thus, after the first iteration, the first pointer always points to the attribute with the highest weight.

At step 1314, control circuitry 904 determines whether the second pointer is at the last attribute of the plurality of attributes. If the second pointer is not at the last attribute, then process 1300 moves to step 1306, where the second pointer is moved to the next attribute in the plurality and process 1300 continues from that point on as described above. IF the second pointer is at the last attribute, process 1300 moves to step 1316.

At step 1316, control circuitry 904 retrieves the attribute associated with the first pointer. As discussed above, process 1300 ensures that the first pointer points at the highest weighted attribute after each iteration of the process. Thus, after all the attributes have been processed, the first pointer will be pointing at the highest weighted attribute as through each step of the process. It should be noted that in some embodiments multiple pointers may be used to retrieve two, three, or more highest weighted attributes to be used in process 1300.

It is contemplated that the descriptions of FIG. 13 may be used with any other embodiment of this disclosure. In addition, the descriptions described in relation to the process of FIG. 13 may be done in alternative orders or in parallel to further the purposes of this disclosure. Furthermore, it should be noted that the process of FIG. 13 may be implemented on a combination of appropriately configured software and hardware, and that any of the devices or equipment discussed in relation to FIGS. 9-10 could be used to implement one or more portions of the process.

When the control circuitry selects, based on a selection criteria, one or more attributes of the plurality of attributes associated with the user, as described in connection with process 1300, process 1100 may continue to step 1110. At step 1110, control circuitry 904 identifies, based on the one or more attributes, a response template of a plurality of response templates previously assigned to the query template. Various ways may be used to make the identification. For example, if the control circuitry determines that time of day in the user's location is selected attribute, the control circuitry may use process 1400 of FIG. 14 to identify an appropriate response template.

At step 1402, control circuitry 904 determines a time of day in the user's location. The control circuitry may make the determination by requesting a time from the network and determining the time zone of the device where the control circuitry resides. The control circuitry may determine the time zone based on a GPS location, or via a location of the closest connection point. Additionally or alternatively, the control circuitry may request its time zone from a remote server.

At step 1404, control circuitry 904 determines, based on the time of day, that the user prefers a shortest response. For example, the user equipment device on which the control circuitry resides may include a profile associated with the user. The profile may include information associated with the user, including length of responses that the user prefers at different times of day. For example, the user may prefer shorter responses on weekday mornings because the user is in a hurry to get to work. In the evening, the user may prefer longer (more completed) responses because the user is not in a hurry to go anywhere. Thus, at step 1404, the control circuitry may have determines that it is a weekday morning, based on the time of day at the user's location, and based on that determination, that the user prefers a shortest length of response.

At step 1406, control circuitry 908 moves a first pointer to a first response template. The first pointer is initially used to point to the first response template, and subsequently to point to the shortest response template as process 1400 iterates through each response template. At step 1408, control circuitry 908 moves a second pointer to a next response template of the plurality of response templates. The second pointer is initially used to point to the second response template and subsequently iterate through each response template of the plurality in order to compare that response template to the response template associated with the first pointer (the shortest response template after each iteration).

It should be noted that both first and second pointers may be pointers to memory locations that store the corresponding response templates. Those response templates may be stored in appropriate data structures. Additionally or alternatively, the response templates may be stored in files (e.g., XML files) and the pointers may be pointing to specific XML files corresponding to specific response templates. In some embodiments, all response templates may be stored in a single file (e.g., XML file) and each pointer may be pointing to a location within a file that includes a specific response template. In some embodiments, the response templates may be stored in a database and the pointers may be pointing to specific database entries. It should further be noted that the response templates may be stored in storage (e.g., storage 908) on the same device where the control circuitry resides. Alternatively or additionally, the response templates may be stored at media content source 1016 and/or media guidance data source 1018 and accessed via communications network 1014.

At step 1410, control circuitry 908 determines whether the response template corresponding to the first pointer is longer than the response template corresponding to the second pointer. If the response template corresponding to the first pointer is not longer (i.e. shorter or the same length) than the response template corresponding to the second pointer, then process 1400 moves to step 1408, where the second pointer is moved to the next response template. However if the response template corresponding to the second pointer is longer than the response template corresponding to the first pointer, then process 1400 moves to step 1412, where the first pointer is moved to the next response template. At step 1412, control circuitry 908 moves the first pointer to the next response template, again setting the first pointer to the shortest response template so far (e.g., after a certain number of iterations).

At step 1414, control circuitry 904 determines whether the second pointer is at the last response template. If the second pointer is not at the last response template, process 1400 moves to step 1408 where the second pointer is moved to the next response template and the process continues. However, if the second pointer is at the last response template, process 1400 moves to step 1416, where control circuitry 908 selects the response template corresponding to the first pointer to use in response to the received natural language query. Because the first pointer points to the shortest response template after each iteration, when all response templates have been process the first pointer will point to the shortest response template of the plurality of response templates.

Figure 14:
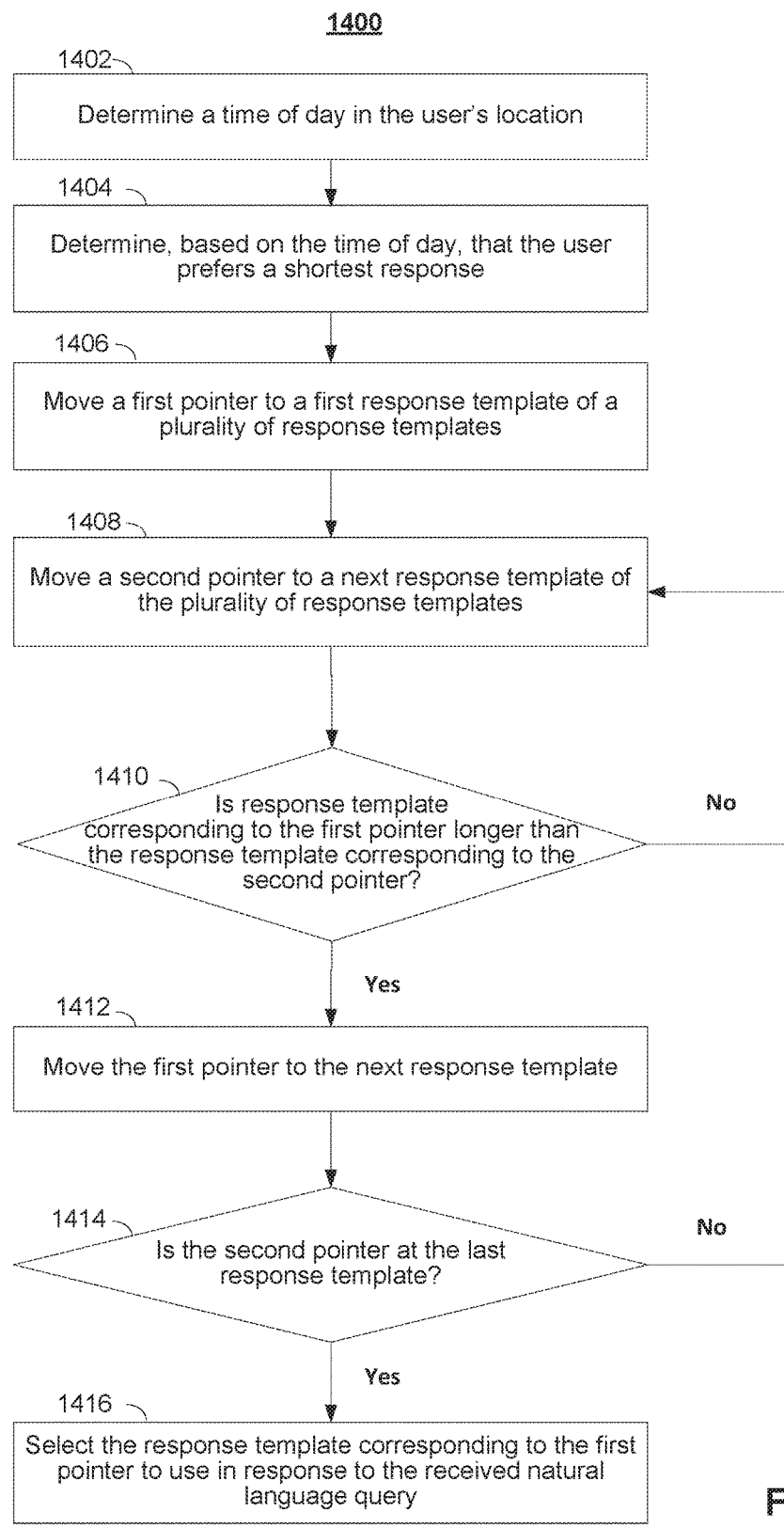
FIG. 14 depicts an illustrative process for identifying a response template of the shortest length, in accordance with some embodiments of this disclosure.

It is contemplated that the descriptions of FIG. 14 may be used with any other embodiment of this disclosure. In addition, the descriptions described in relation to the process of FIG. 14 may be done in alternative orders or in parallel to further the purposes of this disclosure. Furthermore, it should be noted that the process of FIG. 14 may be implemented on a combination of appropriately configured software and hardware, and that any of the devices or equipment discussed in relation to FIGS. 9-10 could be used to implement one or more portions of the process.

When control circuitry 904 identifies, based on the one or more attributes, a response template of a plurality of response templates previously assigned to the query template as described above, control circuitry 904 moves to step 1112 of process 1100. At step 1112, control circuitry 904 generates a response to the natural language query based on the identified response template and the retrieved one or more search results. For example, as described above, if the natural language query is: "Who directed Titanic," and the control circuitry selects time of day at the user's location as an attribute associated with the user, then the control circuitry may select a response template that is of the shortest length, based on that time of the day. As a result, the control circuitry may generate a response "James Cameron" without any other words.

In some embodiments, the plurality of attributes associated with the user includes at least one of: a plurality of characteristics associated with the user, a location of the user, a date associated with the user's location, and a time of day associated with the user's location. For example, control circuitry 904 may select the user's gender as a characteristic of the user. If the user is a male, then the control circuitry may select a response template that delivers a response in a female voice.

In some embodiments, the control circuitry configured to select, based on the selection criteria, the one or more attributes of the plurality of attributes associated with the user may include control circuitry configured to determine a weight associated with each attribute of the plurality of attributes associated with the user and identify the one or more attributes based on the weight associated with each attribute. Determining the one or more attributes based on the weight associated with each attribute has been described in connection with FIG. 13 above.

In some embodiments, the control circuitry may be further configured to adjust the weight of the attribute in response to the attribute being used to identify the response template. For example, if the user's preference for a length of response has been used, then the weight of that attribute may be lessened so that the same attribute is not selected all the time. This would make the system more human-like. It should be noted that at certain time intervals (e.g., every 1 week) all attributes may be reset.

In some embodiments, the control circuitry configured to generate the response to the natural language query based on the identified response template and the retrieved one or more search results may include control circuitry configured to retrieve the identified attribute, and perform a search based on the identified attribute and the one or more search results. Based on the search, the control circuitry may identify information associated with both the identified attribute the one or more search results and update the response to include the identified information. For example, the control circuitry may receive a natural language query: "When is Sleepless in Seattle playing next?" The control circuitry may retrieve the user's location as the identified attribute. The control circuitry may then determine that the user is near the Empire State Building. Based on the user's location and the query, the control circuitry may add to the response template: "By the way, did you know that you are near the Empire State Building?" In another example, the control circuitry may receive a natural language query "Show me a physics related program that is playing soon." The control circuitry may select a date as an attribute associated with the user. Furthermore, the date may be Einstein's Birthday. Based on the date and the connection to physics, the control circuitry may add: "Did you know that today is Einstein's birthday?" to the response template.

In some embodiments, the control circuitry configured to select, based on the selection criteria, the one or more attributes of the plurality of attributes associated with the user may include control circuitry configured to determine a time of day in the user's location, determine, based on the time of day, a relative length of response that the user prefers at the time of day and add to the one or more attributes the relative length of response that the user prefers. User preferences for the length of response have been described above in connection with FIG. 14.

In some embodiments, the control circuitry configured to identify, based on the one or more attributes, the response template of the plurality of response templates previously assigned to the query template may include control circuitry configured to select, based on the one or more attributes, a response template based on the length of response that the user prefers. User preferences for the length of response have been described above in connection with FIG. 14.

In some embodiments, the control circuitry configured to identify, based on the one or more attributes, the response template from the plurality of response templates that have previously been assigned to the query template may include control circuitry configured to retrieve, from a database, one or more attributes associated with the response template and compare the one or more attributes associated with the response template with the one or more attributes of the plurality of attributes associated with the user. Based on the comparison, the control circuitry may identify the response template. For example, each response template may be stored in a database with a corresponding set of matching user attributes. Thus, when a specific attribute associated with the user is selected, a response template matching that attribute may be identified in the database.

In some embodiments, the control circuitry may be further configured to determine that a plurality of search results corresponds to the natural language query and determine, based on past natural language queries received from the user, that one or more search results are preferable over other search results corresponding to the natural language query. Based on the determining, the control circuitry may be configured to generate the response to the natural language query based on the identified response template and the preferred one or more search results. For example, if the query is "When is the Terminator being shown," the control circuitry may determine that there are five broadcasts of "Terminator" scheduled in the next two weeks. However, the control circuitry may determine that the user prefers to know about one or two broadcasts that will occur closest in time to the user's date and time. Thus, the control circuitry may generate a response based on the one or two broadcasts and not deliver the times associated with other broadcasts. In addition, the control circuitry may determine that "Terminator" is available on demand and may generate a response indicating the availability.

In some embodiments, the control circuitry may be configured to receive a plurality of sample natural language queries and a corresponding plurality of sample responses, where each natural language query corresponds to one or more sample responses and generate a plurality of sample query templates based on the plurality of sample natural language queries. The control circuitry may then generate one or more response templates for each sample query template based on the one or more sample responses corresponding to the associated natural language query. For example if the control circuitry receives "Who directed Titanic," as natural language query and sample responses "James Cameron directed Titanic," "Titanic," and "James Cameron is the director of Titanic," the control circuitry may create three response templates that may be represented as <Result> <Action> <query data>, <Result>, and <Result> is <query data>.

In some embodiments, systems and methods are described to provide for a natural language processing system that automatically generates an intelligent response to a natural language query based on one or more attributes associated with a device that receives the query. Specifically, the system may be implemented on a user equipment device that includes a user input interface. The user input interface may be configured to receive the natural language query. For example, the user input interface may receive the natural language query through a microphone or a keyboard associated with the user equipment device. It should be noted that the user input interface may be configured to receive the natural language query from any type of input device, including, but not limited to, mechanical motion devices, audio input devices, visual input devices, or other suitable input devices.

The user equipment device may also include control circuitry that may be configured to process the received natural language query in order to generate a smart response. Specifically, the control circuitry may be configured to receive, from the user input interface the natural language query. For example, the user input interface may receive the natural language query in one of a number of formats (e.g., visual, audio, textual). The user input interface may upon receipt of the natural language query process the query and convert the query into a format that can be further processed by the control circuitry.

Figure 15:
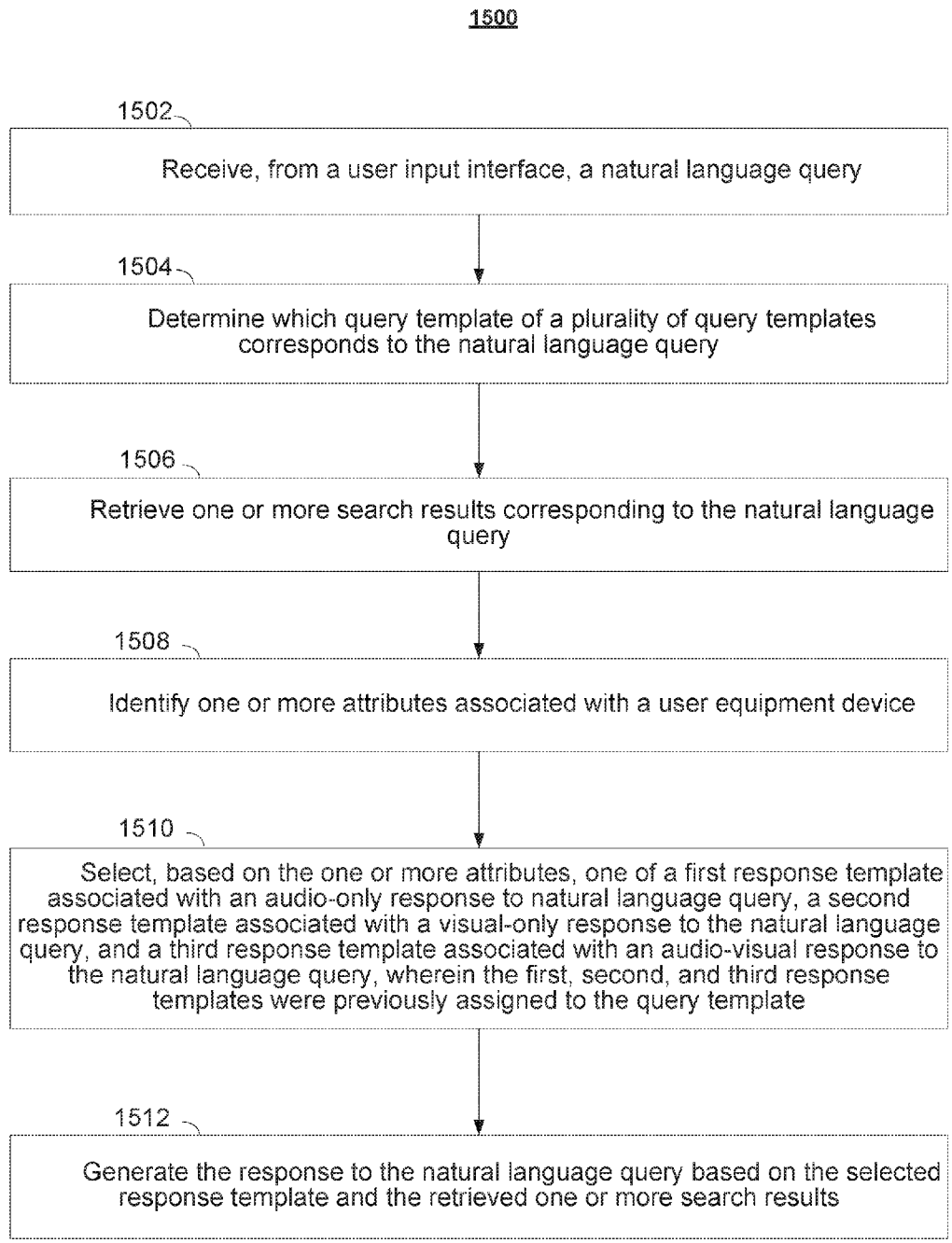
FIG. 15 depicts an illustrative process for generating a response to a natural language query based on one or more user equipment device attributes, in accordance with some embodiments of this disclosure.

In some embodiments control circuitry 904 generates a response to a natural language query as described by process 1500 of FIG. 15. At step 1502, the control circuitry receives, from a user input interface, a natural language query. As described above user input interface 910 may be used to receive the natural language query. For example, a user input interface may include a remote control, mouse, trackball, keypad, keyboard, touch screen, touchpad, stylus input, joystick, voice recognition interface, or another suitable device. The natural language query may then be transmitted from the user input interface to control circuitry 904 through an I/O path (e.g., I/O path 902).

In some embodiments, the control circuitry may be located on one device and a user input interface may be located on another device. For example, a user input interface may be located on a user equipment device (e.g., user television equipment 1002, user equipment 1004, or wireless user communications device 1006), but the control circuitry that processes the query may be located away from the user equipment device (e.g., at media content source 1016, or media guidance data source 1022). The user equipment device At step 1504, control circuitry 904 determines which query template of a plurality of query templates corresponds to the natural language query. Process 1200 of FIG. 12 is one illustration of how control circuitry 904 may determine which query template of a plurality of query templates corresponds to the natural language query. Process 1200 of FIG. 12 has been described above.

At step 1506, control circuitry 904 retrieves one or more search results corresponding to the natural language query. The control circuitry may determine a search query based on the query template. For example, "show me" may be excluded from the search because it is part of the template. So the search string may include terms such as "movie," "directed," "James Cameron." When the search results are retrieved, the control circuitry may extract movie titles from the results or this can be done by another system before the results reach the control circuitry.

Figure 16:
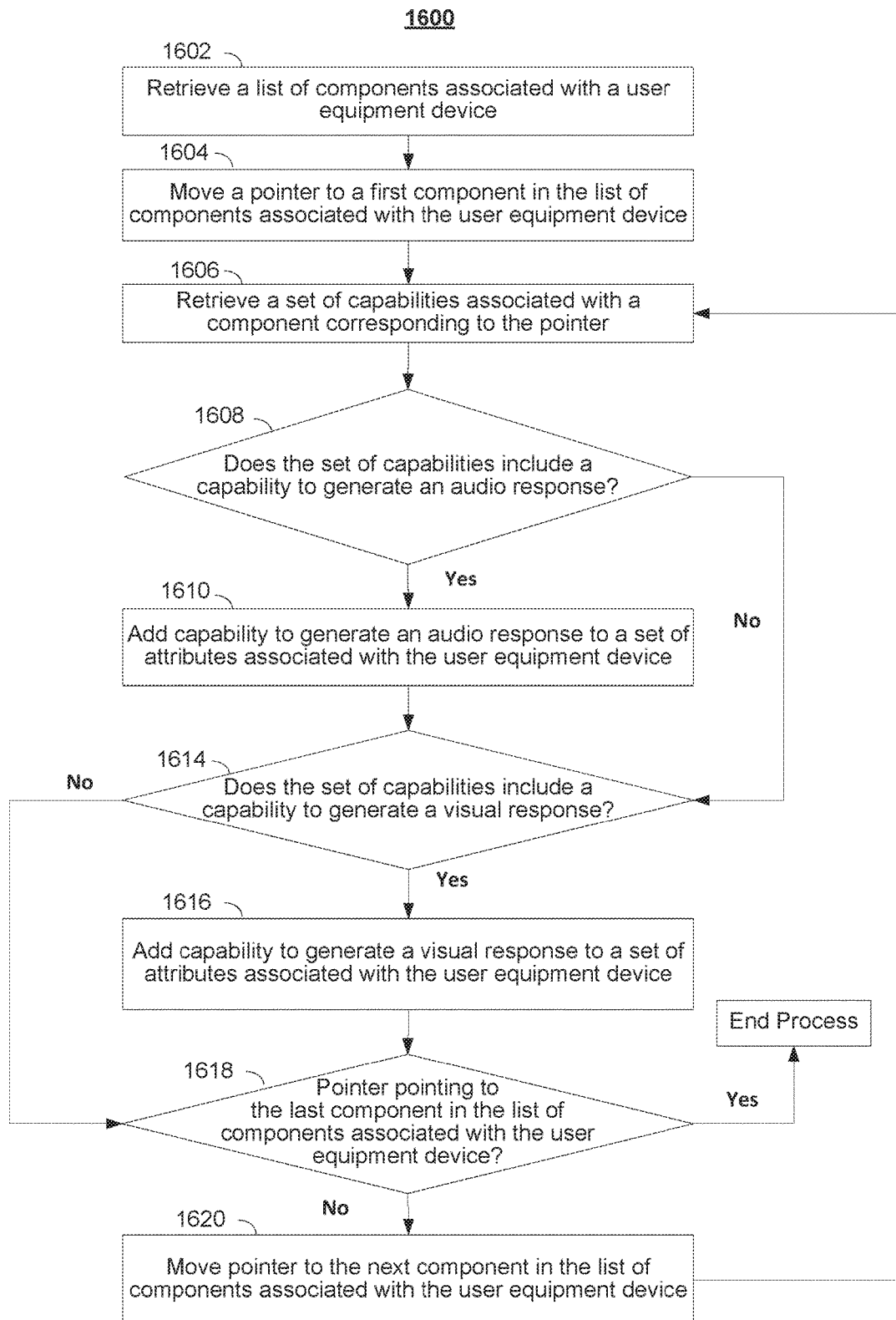
FIG. 16 depicts an illustrative process for identifying components associated with a user equipment device and adding indications of specific components to a set of attributes associated with the user equipment device, in accordance with some embodiments of this disclosure.

At step 1508, control circuitry 904 identifies one or more attributes associated with a user equipment device. Process 1600 of FIG. 16 illustrates one way that control circuitry 904 may identify one or more attributes associated with the user equipment device.

At step 1602, control circuitry 904 retrieves a list of components associated with a user equipment device. The control circuitry may perform the retrieval operation in various ways. For example, some user equipment devices execute component inventories in specific time intervals and store that information in storage (e.g., storage 908). For those user equipment devices, the control circuitry may just retrieve the list of components from the appropriate location in the storage. Some user equipment devices do not perform such an inventor, but include an API command to execute an inventory and return the results to the requesting program or thread. For those user equipment devices, the control circuitry may execute the API command and retrieve fro the results the list of components associated with the user equipment device.

At this point, process 1600 begins to iterate through all the components and determine the capabilities of each component (e.g., whether the component has audio output capabilities and/or video output capabilities. Specifically, At step 1604, control circuitry 904 moves a point to a first component in the list of components associated with the user equipment device. A pointer may be similar to any pointer described in regards to other processes described above.

At step 1606, control circuitry 908 retrieves a set of capabilities associated with a component corresponding to the pointer. For example, each component in the list of components may also be stored with a set of capabilities for that component. For example, if the component is a video card, together with name of the component, information such as type of component (e.g., video output component), available resolutions, color information, or other suitable information may be stored and at this point retrieved by the control circuitry.

At step 1608, the control circuitry determines whether the set of capabilities includes a capability to generate an audio response. For example, if the component is an audio component (e.g., an audio card, an audio chip, connected to a speaker), the control circuitry may determine that the device has a capability to generate an audio response. Thus, process 1600 moves to step 1610, where control circuitry 904 adds the capability to generate an audio response to a set of attributes associated with the user equipment device. However, if the component does not have a capability to generate an audio response, process 1600 skips step 1610 and goes directly to step 1614.

At step 1614, control circuitry 904 determines whether the set of capabilities for the component being processed includes a capability to generate a visual response. For example, if the component is a video process connected to a display screen (whether the display screen is internal or external), the control circuitry may determine that the device has the capability to generate a visual response and move to step 1616. At step 1616, control circuitry 908 adds the capability to generate a visual response to a set of attributes associated with the user equipment device. For example, a set of attributes associated with the user equipment device may be stored in storage 908. The control circuitry may be updating the capabilities of the device in the storage. Additionally or alternatively, the capabilities of each user equipment device may be transmitted to a remote server and stored in a database. For example, the capabilities of multiple user equipment devices may be stored and media content source 1016 and/or media guidance data source 1018 and accessed via communications network 1014.

At step 1618, the control circuitry determines whether the pointer is pointing to the last component in the list of components associated with the user equipment device. This step ensures that all components of the system are processed and proper system capabilities are detected. If the pointer is pointing to the last component in the list, process 1600 ends. At this point, all the components have been process and all the capabilities of the device have been detected. A message may be transmitted to the system indicating that the process finished successfully. However, if the pointer is not pointing at the last component in the list, process 1600 moves to step 1620 where control circuitry 904 moves the pointer to the next component in the list of components associated with the user equipment device, and process 1600 moves to step 1606 where the next component is processed.

It is contemplated that the descriptions of FIG. 16 may be used with any other embodiment of this disclosure. In addition, the descriptions described in relation to the process of FIG. 16 may be done in alternative orders or in parallel to further the purposes of this disclosure. Furthermore, it should be noted that the process of FIG. 16 may be implemented on a combination of appropriately configured software and hardware, and that any of the devices or equipment discussed in relation to FIGS. 9-10 could be used to implement one or more portions of the process.

When the control circuitry identifies one or more attributes associated with the user equipment device at step 1508 of process 1500, process 1500 moves to step 1510. At step 1510, control circuitry 904 selects, based on the one or more attributes, one of a first response template associated with an audio-only response to natural language query, a second response template associated with a visual-only response to the natural language query, and a third response template associated with an audio-visual response to the natural language query, where the first, second, and third response templates were previously assigned to the query template.

For example, if the control circuitry has determined at step 1508 that the user equipment device has the capabilities to output audio-visual responses an audio visual response template may be selected. However, if the user equipment device has the capabilities for only audio output, an audio-only template may be selected.

In some embodiments, the one or more attributes associated with the user equipment device may include a plurality of characteristics associated with the user equipment device, a location of the user equipment device, a date associated with the location of the user equipment device, an orientation of the user equipment device, and a time of day associated with the user equipment device. For example, if the attribute of the user equipment device, at the time of the natural language query is that the device is set to a silent mode, a visual-only template may be chosen based on that attribute.

In some embodiments, the control circuitry configured to identify the one or more attributes associated with the user equipment device includes control circuitry configured to retrieve a plurality of attributes associated with the user equipment device and determine a weight associated with each attribute of the plurality of attributes associated with the user equipment device. The control circuitry may be configured to identify the one or more attributes based on the weight associated with each attribute of the plurality of attributes. The determination of weight associated with each attribute of the user equipment device may be performed in a similar manner as the weight associated with each user attribute described above in connection with FIG. 13.

In some embodiments, the control circuitry configured to identify the one or more attributes associated with the user equipment device may include control circuitry configured to identify an application of the user equipment device that the user interacted with last and add the application to the one or more identified attributes. For example, a user may be jogging and executing a fitness application. Thus, the control circuitry may determine based on the last accessed fitness application that the user may not be looking at a display screen associated with the device and based on that select an audio-only response template.

In some embodiments, the control circuitry may be further configured to receive a generic response template associated with the natural language query and determine whether the generic response template may be converted into at least one of an audio response template, a visual response template, and a mixed audio and visual response template. Based on determining that the generic response template can be converted into the audio response template, convert the generic response template into the first response template. Based on determining that the generic response template can be converted into the visual response template, convert the generic response template into the second response template. And, based on determining that the generic response template can be converted into an audio-visual response template, convert the generic response template into the third response template. In general many response templates may be converted to audio, visual, and audio-visual response templates. However in some cases they cannot.

For example, if the natural language query is "Play me a rock song," it may be inefficient to display anything on the screen, but instead just to play the song as the user desires. In those instances, visual and audio-visual response templates may not be generated for the generic template. In another example, if the natural language query is "Show me a photo of my kids," it may be inefficient to create audio and audio-visual response templates. Thus, the control circuitry may just create a visual response template showing the image requested.

In some embodiments, the control circuitry configured to identify the one or more attributes associated with the user equipment device may include control circuitry configured to determine that the user equipment device is associated with a speaker and a display and based on the determining, add an indication associated with the speaker and an indication associated with the display to the one or more attributes. The control circuitry may make the determination in similar ways as described above (e.g., in connection with FIG. 16. Once the determination is made the control circuitry may store the indications in storage 908 or on a remote server (as described above).

In some embodiments, the control circuitry configured to select, based on the one or more attributes, one of the first response template, the second response template, and the third response template may include control circuitry configured to select the third response template based on the user equipment device being associated with a speaker and a display. As described above, an audio-visual response template may be selected based on a speaker and a display being associated with the user equipment device.

Figure 17:
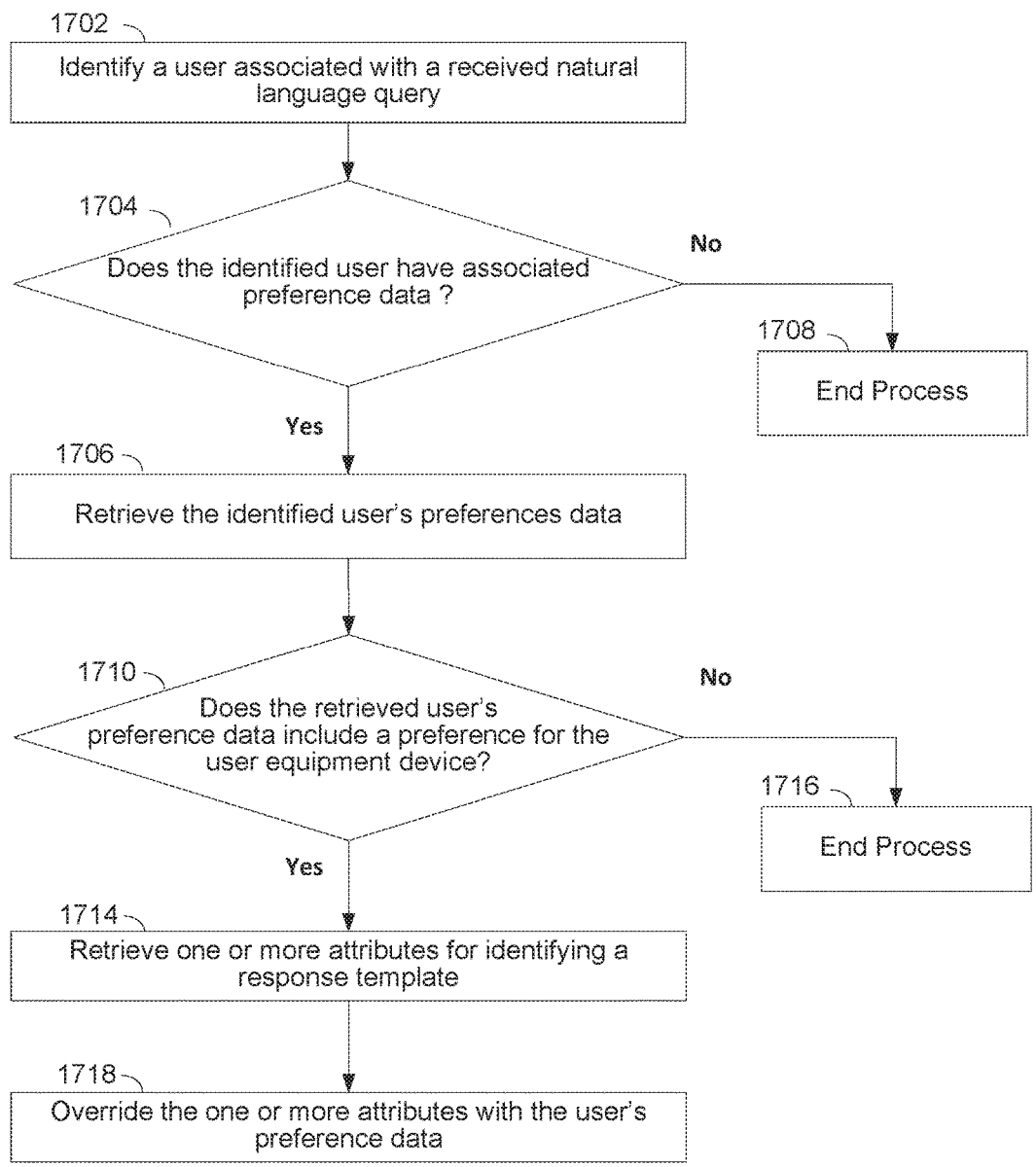
FIG. 17 depicts an illustrative process for overriding the identified attributes with a user's preference for the user equipment device, in accordance with some embodiments of this disclosure.

In some embodiments, it may be desirable to override the system determination with the user's preferred output. Specifically, the control circuitry may be further configured to identify a user that is associated with the natural language query and determine whether the user prefers to receive one of an audio-only response, a visual-only response, and an audio-visual response from the user equipment device. Based on the determining, the control circuitry overrides the one or more attributes with the user's preference for the user equipment device. Process 1700 of FIG. 17 illustrates an example of a process that may be used to override the system's determinations with the user's preference.

At step 1702, control circuitry 904 identifies a user associated with a received natural language query. The control circuitry may perform the identification in various ways. For example, if the user speaks the natural language query into a microphone associated with the device, the control circuitry may identify the user via voice recognition. If the user uses a keyboard, mouse, and/or touchscreen to input the natural language query, the control circuitry may identify the user via a fingerprint identification required to unlock the device. Additionally or alternatively, the user may be required to login to the user equipment device. Thus, the login information may be used to identify the user. In some embodiments a camera may be activated and the user may be identified via face recognition.

At step 1704, control circuitry 904 determines whether the identified user has associated preference data. If the identified user does not have preference data, process 1700 moves to step 1708. When no user preference data exists, there is nothing to override the system's determinations. However, if the user has associated preference data process 1700 moves to step 1706.

At step 1706, control circuitry 904 retrieves the identified user's preference data. The preference data may be stored locally on the user equipment device where the control circuitry resides (e.g., in storage 908). Additionally or alternatively, the preference data may be stored on a remote server (e.g., at media content source 1016 and/or media guidance data source 1018). The preference data in those instances may be accessed via communications network 1014. It should be noted that the preference data may be stored both on the user equipment device or multiple user equipment devices and on the remote server or remove servers. The preference data may be synchronized between all devices. For example, if the user updates his/her preference data on a first user equipment device, the update may be transmitted to a server and then from the server to other user equipment devices that do not have an update yet. Each version of the user preference data may have a version number and the version numbers may be incremented when the data is updated. Thus, when a version number on one device is lower then on another device, the system may determine that an update is needed. It should be noted that the preference data may be updated on one user equipment device from another user equipment device without the need to first update the preference data on the server.

At step 1710, control circuitry 904 determines whether the retrieved user's preference data includes a preference for the user equipment device. If preference data for the user equipment device is not included then process moves to step 1716 and ends. Specifically, if there is no preference data to override the system determinations with, then the process may not continue. However, if the control circuitry determines that there is preference data included for the user equipment device, process 1700 moves to step 1714.

At step 1714, control circuitry 904 retrieves one or more attributes that a response template is to be identified based on. The control circuitry may retrieve those attributes from storage 908 or from a remote server located at media content source 1016 and/or media guidance data source 1018. If the one or more attributes are located at a remote server, they may be retrieved via communications network 1014. At step 1718, control circuitry 908 overrides the one or more attributes with the user's preference data. For example, if the user preference data indicates that the user prefers audio-only responses from a specific user equipment device, the control circuitry may override the preferences identified by the system with an audio-only preference.

It is contemplated that the descriptions of FIG. 17 may be used with any other embodiment of this disclosure. In addition, the descriptions described in relation to the process of FIG. 17 may be done in alternative orders or in parallel to further the purposes of this disclosure. Furthermore, it should be noted that the process of FIG. 17 may be implemented on a combination of appropriately configured software and hardware, and that any of the devices or equipment discussed in relation to FIGS. 9-10 could be used to implement one or more portions of the process.

In some embodiments, the control circuitry configured to identify, based on the one or more attributes, the first response template, the second response template or the third response template may include control circuitry configured to select the first response template based on the user's preference for the user equipment device. As described above, if the one or more attributes are overwritten with an audio-only attribute based on a user preference, the control circuitry may select an audio-only response template.

In some embodiments, the control circuitry configured to identify the one or more attributes associated with the user equipment device may include control circuitry configured to determine an orientation of the user equipment device and add the orientation of the user equipment device to the one or more attributes. For example, if the user is jogging the user equipment device (e.g., the user's smart phone) is in the user's pocket, the control circuitry may determine that the smart phone is oriented vertically (i.e., is not laying flat on a surface such as a table). Thus, the control circuitry may determine that the user may not have a way to view the display of the smart phone. Thus, the control circuitry may add the orientation of the device to the one or more attributes, and based on that select an audio-only response template.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A system for generating a response to a natural language query, the system comprising:
   a user input interface of a user equipment device, wherein the user input interface is configured to receive the natural language query; and
   control circuitry configured to:
      receive, from the user input interface, the natural language query;
      identify which query template of a plurality of query templates corresponds to the natural language query, wherein the identified query template comprises: an associated first response template for providing an audio-only response to the natural language query, an associated second response template for providing a visual-only response to the natural language query, and an associated third response template for providing an audio-visual response to the natural language query;
      retrieve one or more search results corresponding to the natural language query;
      determine whether the user equipment device is associated with an audio component and a display;
      in response to determining that the user equipment device is associated with the audio component and the display, update one or more attributes associated with the user equipment device to indicate that the user equipment device is associated with the audio component and the display;
      select the associated third response template for providing the audio-visual response to the natural language query based on the one or more attributes indicating that the user equipment device is associated with the audio component and the display; and
      generate the response to the natural language query based on the selected response template and the retrieved one or more search results.

2. The system of claim 1, wherein the one or more attributes associated with the user equipment device comprise: a plurality of characteristics associated with the user equipment device, a location of the user equipment device, a date associated with the location of the user equipment device, an orientation of the user equipment device, and a time of day associated with the user equipment device.

3. The system of claim 1, wherein the control circuitry configured to identify the one or more attributes associated with the user equipment device comprises control circuitry configured to:
   retrieve a plurality of attributes associated with the user equipment device;

determine a weight associated with each attribute of the plurality of attributes associated with the user equipment device; and identify the one or more attributes based on the weight associated with each attribute of the plurality of attributes.

4. The system of claim 1, wherein the control circuitry configured to identify the one or more attributes associated with the user equipment device comprises control circuitry configured to:

identify an application of the user equipment device that the user interacted with last; and add the application to the one or more identified attributes.

5. The system of claim 1 wherein the control circuitry is further configured to:

receive a generic response template associated with the natural language query;

determine whether the generic response template may be converted into at least one of an audio response template, a visual response template, and a mixed audio and visual response template;

based on determining that the generic response template can be converted into the audio response template, convert the generic response template into the associated first response template;

based on determining that the generic response template can be converted into the visual response template, convert the generic response template into the associated second response template; and based on determining that the generic response template can be converted into an audiovisual response template, convert the generic response template into the associated third response template.

6. The system of claim 1, wherein the control circuitry is further configured to:

identify a user that is associated with the natural language query;

determine whether the user prefers to receive one of an audio-only response, a visual-only response, and an audio-visual response from the user equipment device; and based on the determining, overwrite the one or more attributes with the user's preference for the user equipment device.

7. The system of claim 1, wherein the control circuitry configured to identify the one or more attributes associated with the user equipment device comprises control circuitry configured to:

determine an orientation of the user equipment device; and add the orientation of the user equipment device to the one or more attributes.

8. A method for generating a response to a natural language query, the method comprising:

receiving, using a control circuitry of a user equipment device, the natural language query;

identifying, using the control circuitry, which query template of a plurality of query templates corresponds to the natural language query, wherein the identified query template comprises: an associated first response template for providing an audio-only response to the natural language query, an associated second response template for providing a visual-only response to the natural language query, and an associated third response template for providing an audio-visual response to the natural language query;

retrieving, using the control circuitry, one or more search results corresponding to the natural language query;

determining, using the control circuitry, whether the user equipment device is associated with an audio component and a display;

in response to determining that the user equipment device is associated with the audio component and the display, updating, using the control circuitry, one or more attributes associated with the user equipment device to indicate that the user equipment device is associated with the audio component and the display;

selecting, using the control circuitry, the associated third response template for providing the audio-visual response to the natural language query based on the one or more attributes indicating that the user equipment device is associated with the audio component and the display; and generating the response to the natural language query based on the selected response template and the retrieved one or more search results.

9. The method of claim 8, wherein the one or more attributes associated with the user equipment device comprise: a plurality of characteristics associated with the user equipment device, a location of the user equipment device, a date associated with the location of the user equipment device, an orientation of the user equipment device, and a time of day associated with the user equipment device.

10. The method of claim 8, wherein identifying the one or more attributes associated with the user equipment device comprises:

retrieving a plurality of attributes associated with the user equipment device;

determining a weight associated with each attribute of the plurality of attributes associated with the user equipment device; and identifying the one or more attributes based on the weight associated with each attribute of the plurality of attributes.

11. The method of claim 8, wherein identifying the one or more attributes associated with the user equipment device comprises:

identifying an application of the user equipment device that the user interacted with last; and adding the application to the one or more identified attributes.

12. The method of claim 8, further comprising:

receiving a generic response template associated with the natural language query;

determining whether the generic response template may be converted into at least one of an audio response template, a visual response template, and a mixed audio and visual response template;

based on determining that the generic response template can be converted into the audio response template, converting the generic response template into the associated first response template;

based on determining that the generic response template can be converted into the visual response template, converting the generic response template into the associated second response template; and based on determining that the generic response template can be converted into an audiovisual response template, converting the generic response template into the associated third response template.

13. The method of claim 8, further comprising:

identifying a user that is associated with the natural language query;

determining whether the user prefers to receive one of an audio-only response, a visual-only response, and an audio-visual response from the user equipment device; and based on the determining, overriding the one or more attributes with the user's preference for the user equipment device.

14. The method of claim 8, wherein identifying the one or more attributes associated with the user equipment device comprises:

determining an orientation of the user equipment device; and adding the orientation of the user equipment device to the one or more attributes.

\* \* \* \* \*